US010951443B2

(12) United States Patent
Nakano et al.

(10) Patent No.: US 10,951,443 B2
(45) Date of Patent: *Mar. 16, 2021

(54) COMMUNICATION DEVICE AND COMMUNICATION METHOD

(71) Applicant: Sony Corporation, Tokyo (JP)

(72) Inventors: Hiroaki Nakano, Tokyo (JP); Uichiro Omae, Kanagawa (JP); Hiroaki Fujita, Kanagawa (JP); Masayoshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,874

(22) Filed: Jan. 25, 2019

(65) Prior Publication Data

US 2019/0173700 A1 Jun. 6, 2019

Related U.S. Application Data

(63) Continuation of application No. 15/545,135, filed as application No. PCT/JP2016/052424 on Jan. 28, 2016, now Pat. No. 10,243,767.

(30) Foreign Application Priority Data

Mar. 17, 2015 (JP) .............................. 2015-053573

(51) Int. Cl.
*H04L 27/04* (2006.01)
*G06K 19/07* (2006.01)
(Continued)

(52) U.S. Cl.
CPC .............. *H04L 27/04* (2013.01); *G06K 19/07* (2013.01); *G06K 19/0723* (2013.01); *H04B 1/59* (2013.01);
(Continued)

(58) Field of Classification Search
CPC ... H04L 27/04; H04L 7/0337; G06K 19/0723; G06K 19/07; H04B 5/0093; H04B 1/59; H04B 5/02
See application file for complete search history.

(56) References Cited

U.S. PATENT DOCUMENTS 10,243,767 B2 * 3/2019 Nakano .................. G06K 19/07
2005/0077356 A1 * 4/2005 Takayama .......... G06K 7/10237
235/451
(Continued)

FOREIGN PATENT DOCUMENTS

CN 101951281 A 1/2011
CN 102411698 A 4/2012
(Continued)

OTHER PUBLICATIONS

Partial Supplementary European Search Report dated Oct. 26, 2018 for corresponding European Application No. 16764538.1.
(Continued)

*Primary Examiner* — Kenneth T Lam
(74) *Attorney, Agent, or Firm* — Michael Best & Friedrich LLP

(57) ABSTRACT

A communication device according to the disclosure includes: a signal generator that generates, on the basis of the first signal received from a communication partner through a coil, a second signal that synchronizes with the first signal; a first modulator configured to be able to modulate the first signal on the basis of the second signal; a second modulator configured to be able to modulate the first signal; and a communication controller that selects, on the basis of the first signal, whichever modulator is to be operated, from the first modulator and the second modulator.

33 Claims, 17 Drawing Sheets

(51) Int. Cl.
*H04B 1/59* (2006.01)
*H04B 5/02* (2006.01)
*H04B 5/00* (2006.01)
*H04L 7/033* (2006.01)

(52) U.S. Cl.
CPC ............ *H04B 5/0093* (2013.01); *H04B 5/02* (2013.01); *H04L 7/0337* (2013.01)

(56) References Cited

U.S. PATENT DOCUMENTS

| | | |
|---|---|---|
| 2006/0049918 A1 | 3/2006 | Takiguchi |
| 2006/0206165 A1 | 9/2006 | Jaax et al. |
| 2008/0225932 A1* | 9/2008 | Fukuda ................ G01S 13/758 375/216 |
| 2009/0040022 A1* | 2/2009 | Finkenzeller ........ G06K 7/0008 340/10.1 |
| 2009/0256684 A1 | 10/2009 | Fukuda et al. |
| 2011/0127843 A1* | 6/2011 | Karaoguz .......... G06K 7/10207 307/104 |
| 2011/0291811 A1* | 12/2011 | Nakano .................... H04B 5/02 340/10.4 |
| 2012/0235508 A1 | 9/2012 | Ichikawa |
| 2013/0234832 A1 | 9/2013 | Manzi |
| 2013/0288599 A1 | 10/2013 | Bernard et al. |
| 2014/0003548 A1 | 1/2014 | Lefley |
| 2014/0092659 A1 | 4/2014 | Lin et al. |
| 2014/0218176 A1* | 8/2014 | Thueringer .......... H04B 5/0031 340/10.5 |
| 2014/0306805 A1 | 10/2014 | Jung et al. |
| 2015/0108210 A1* | 4/2015 | Zhou ....................... H03H 7/18 235/375 |
| 2016/0117535 A1* | 4/2016 | Kawano ............... H04B 5/0031 340/10.3 |
| 2017/0373726 A1* | 12/2017 | Nakano ................ G06K 19/07 |
| 2018/0145763 A1 | 4/2018 | Fujita et al. |
| 2018/0160383 A1 | 6/2018 | Nakano et al. |

FOREIGN PATENT DOCUMENTS

| | | |
|---|---|---|
| CN | 103117775 A | 5/2013 |
| CN | 103269220 A | 8/2013 |
| CN | 103516505 A | 1/2014 |
| CN | 103971076 A | 8/2014 |
| EP | 2680457 A2 | 1/2014 |
| JP | 2008-054279 A | 3/2008 |
| JP | 2008-210301 A | 9/2008 |
| JP | 2009-064315 A | 3/2009 |
| JP | 2011-254156 A | 12/2011 |
| JP | 2012-014607 A | 1/2012 |
| JP | 2013-062605 A | 4/2013 |

OTHER PUBLICATIONS

Extended European Search Report dated Feb. 1, 2019 for corresponding European Application No. 16764538.1.
K. Finkenzeller et al., "Battery powered tags for ISO/IEC 14443, actively emulating load modulation," RFID SysTech 2011, Germany, pp. 1-9.
Chinese Office Action dated May 29, 2020 for corresponding Chinese Application No. 201680014331.8.

* cited by examiner

[FIG 1]
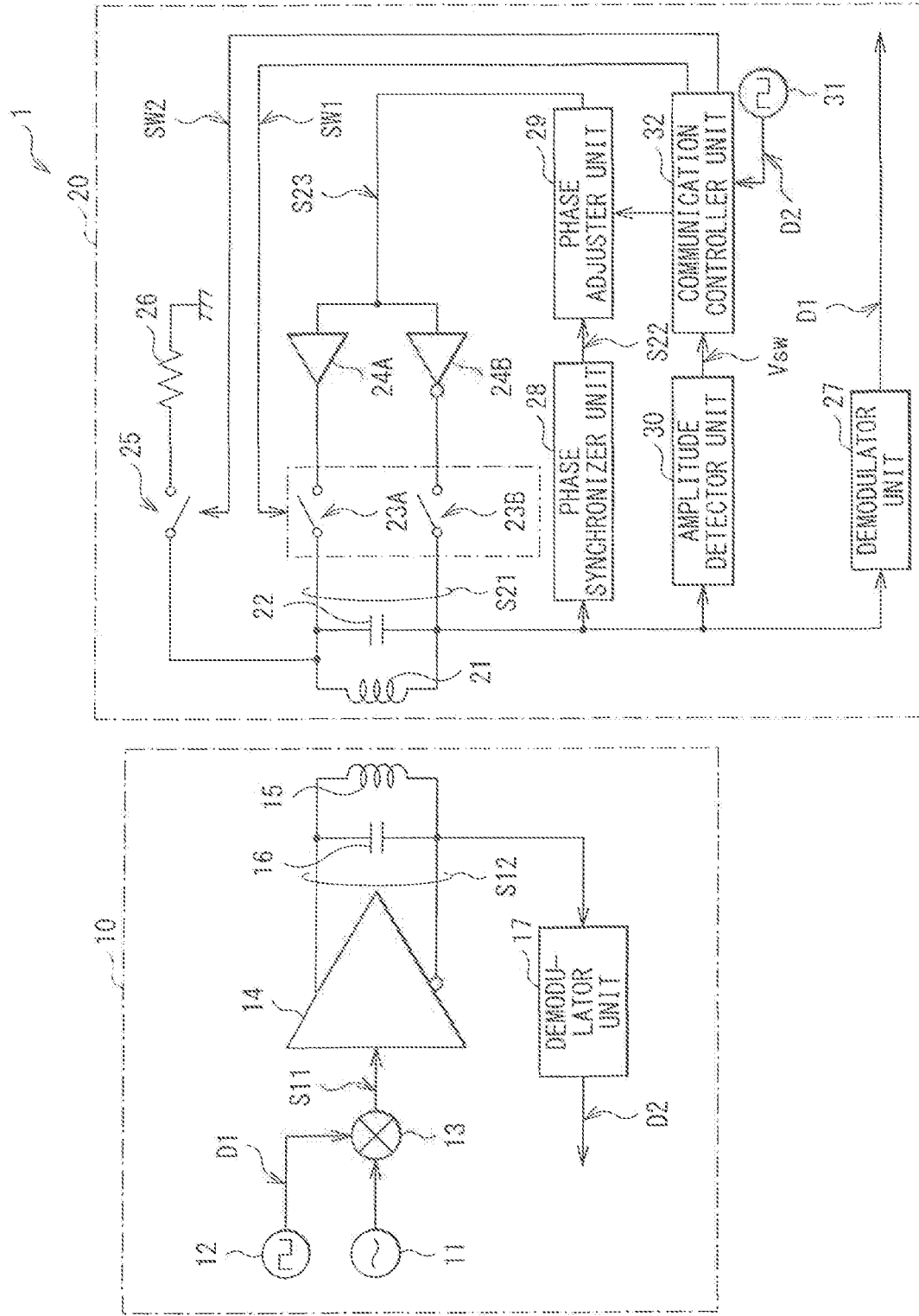

[ FIG. 2A ]
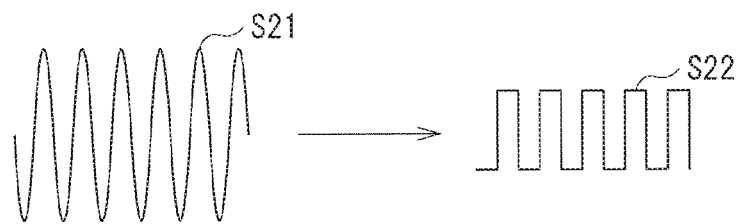
[ FIG. 2B ]
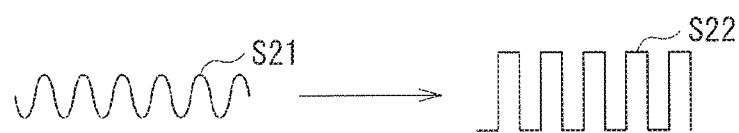
[ FIG. 3 ]
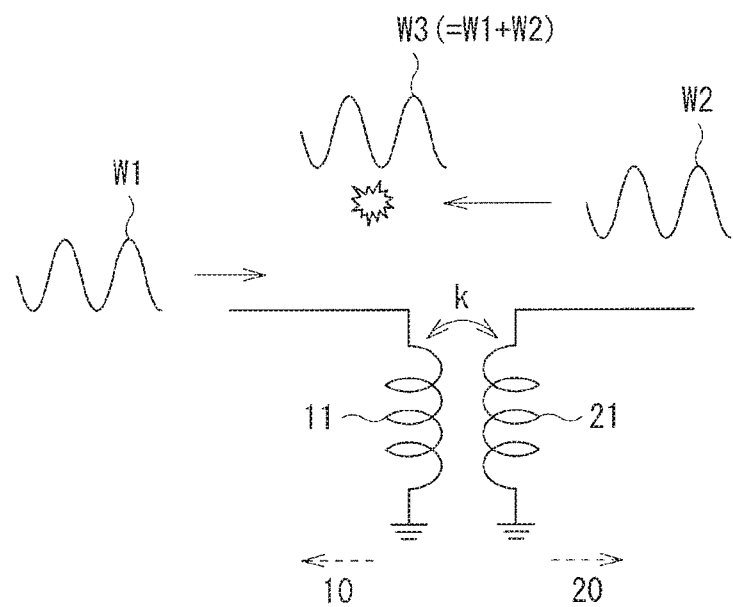

[ FIG. 4 ]
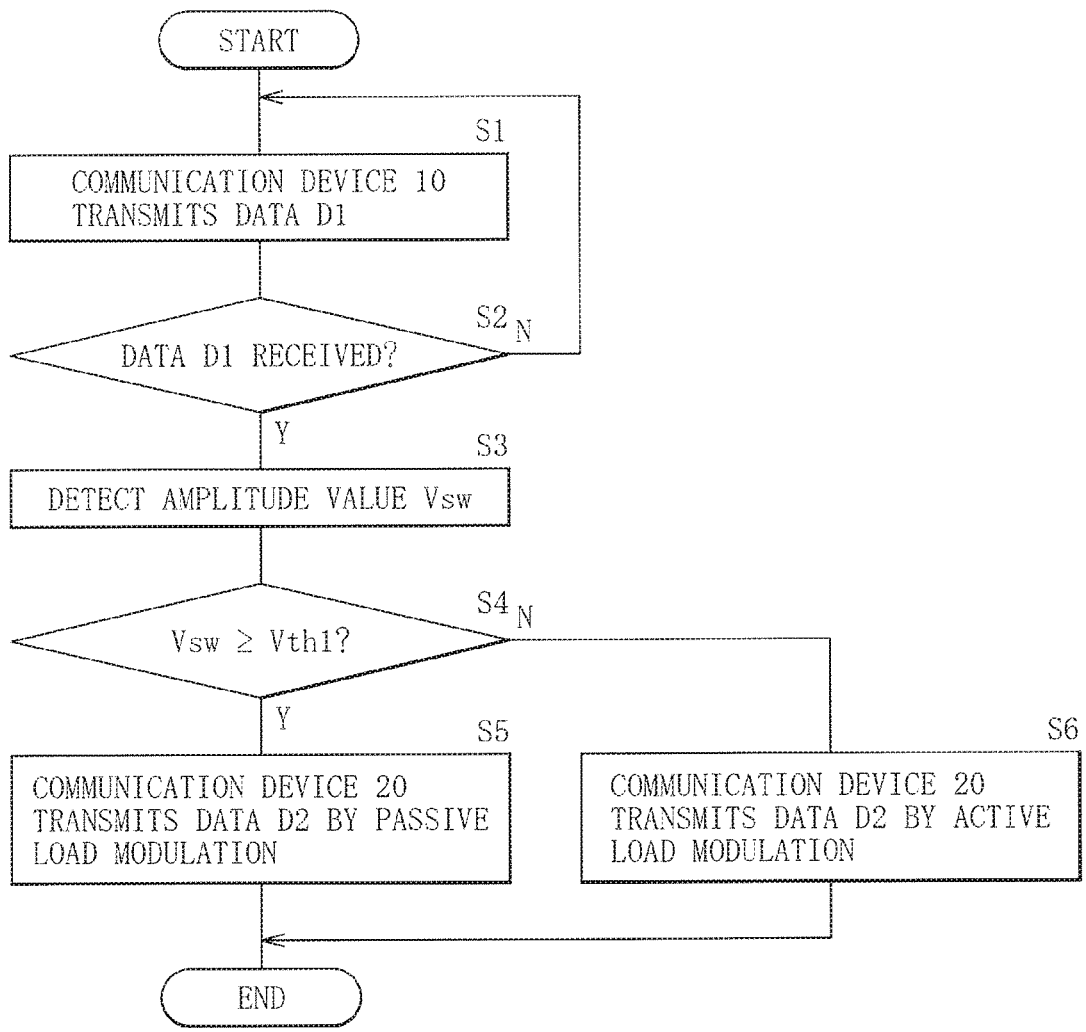

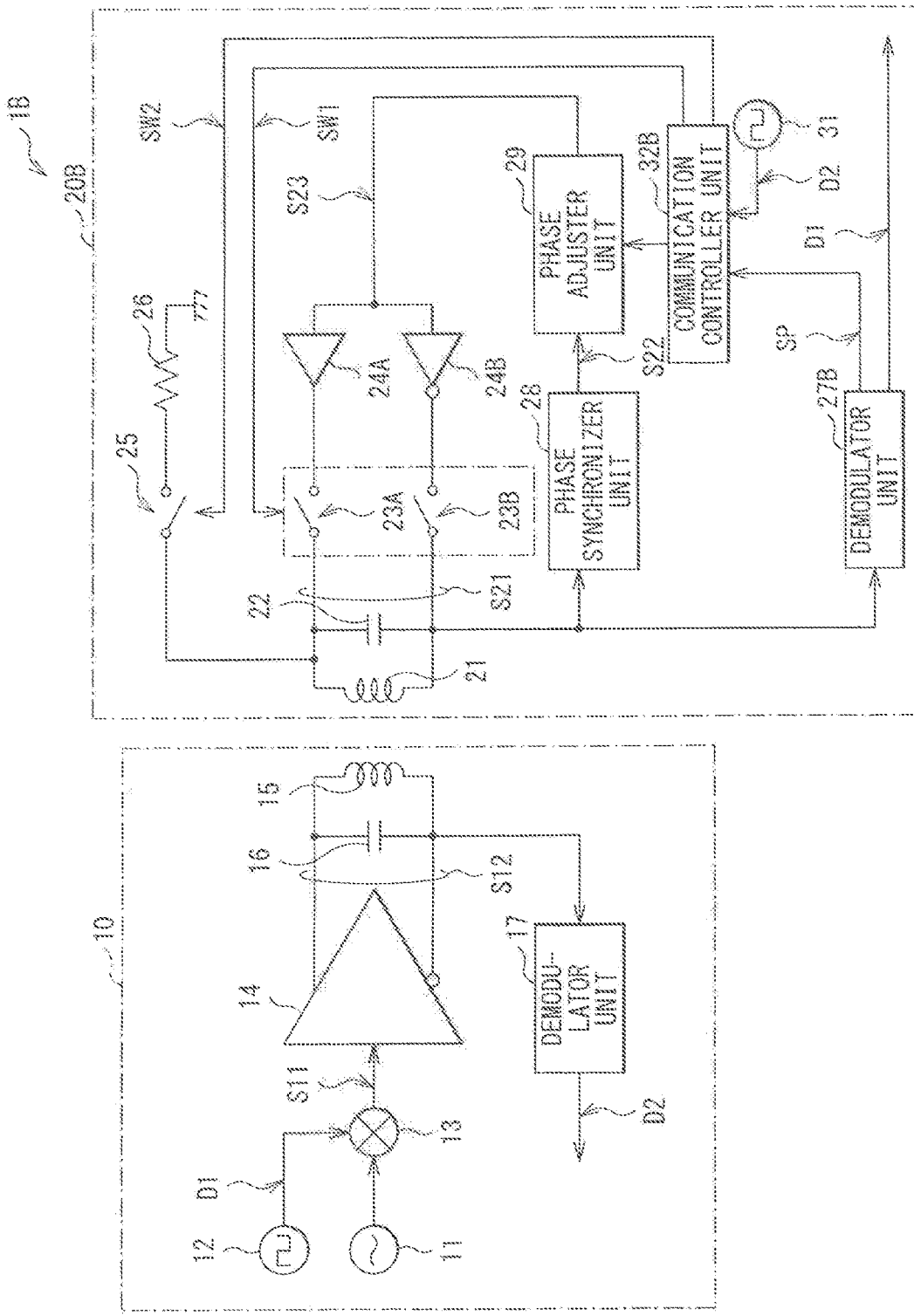
[FIG 5]

[ FIG. 6 ]
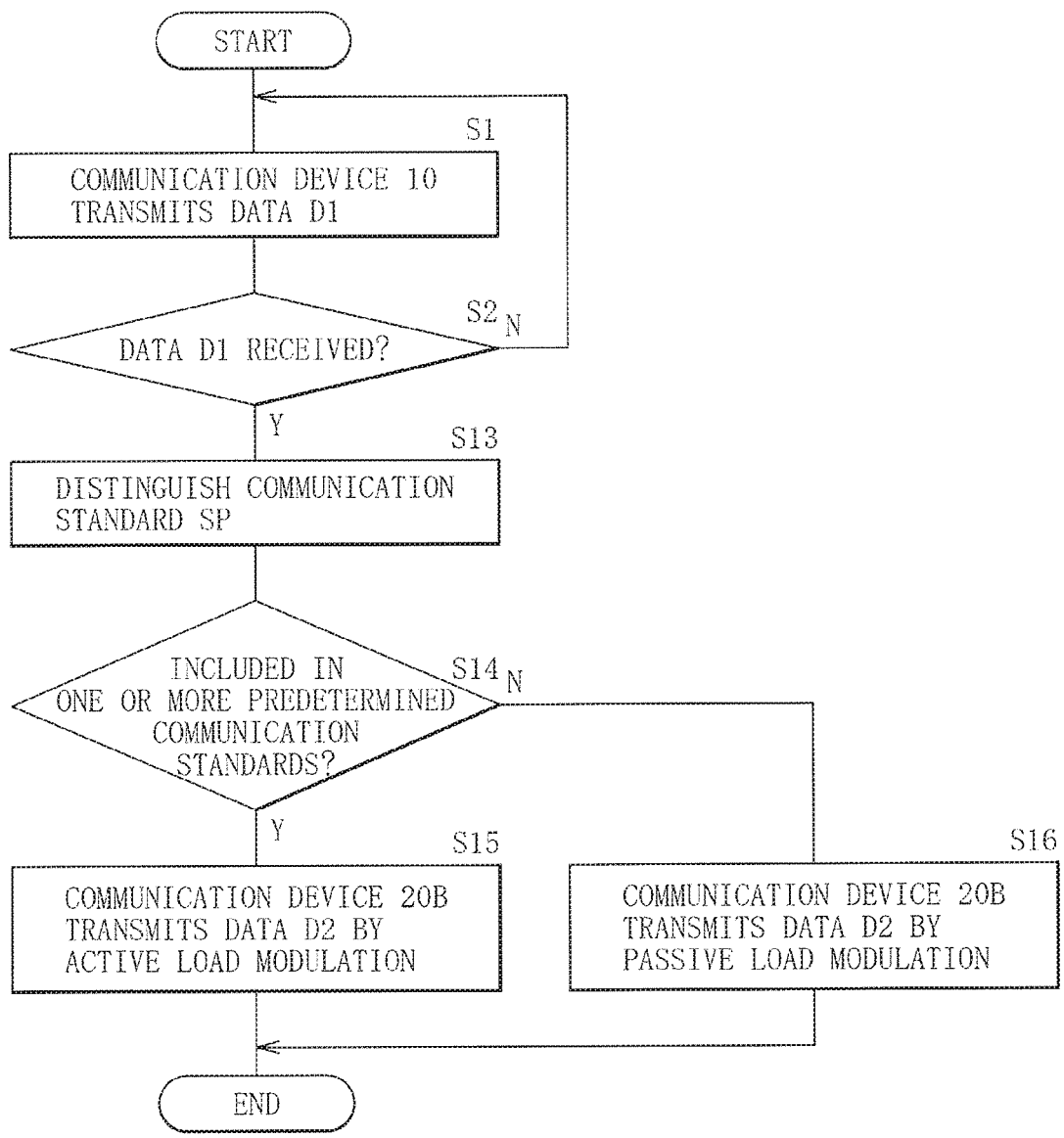

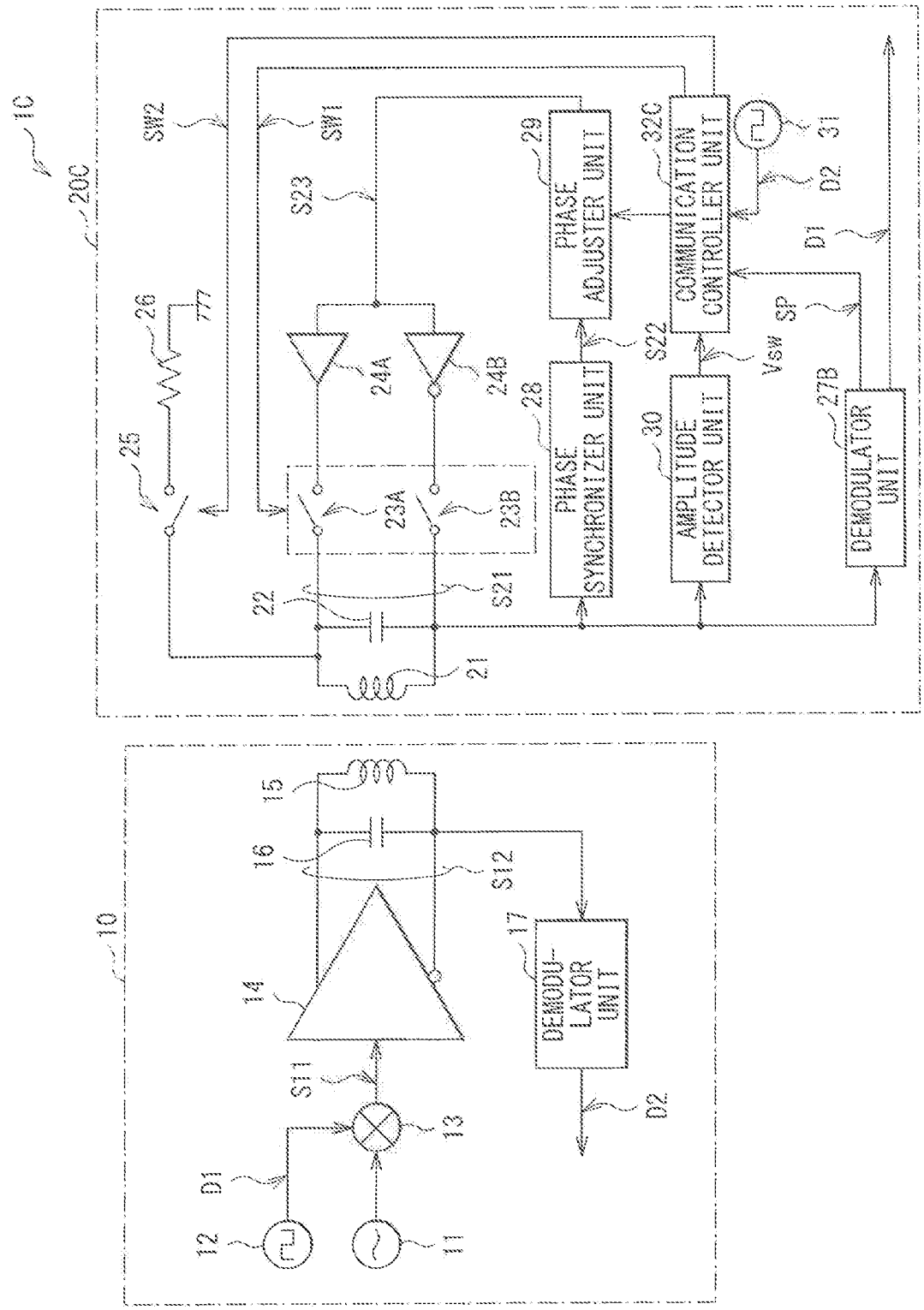
[FIG 7]

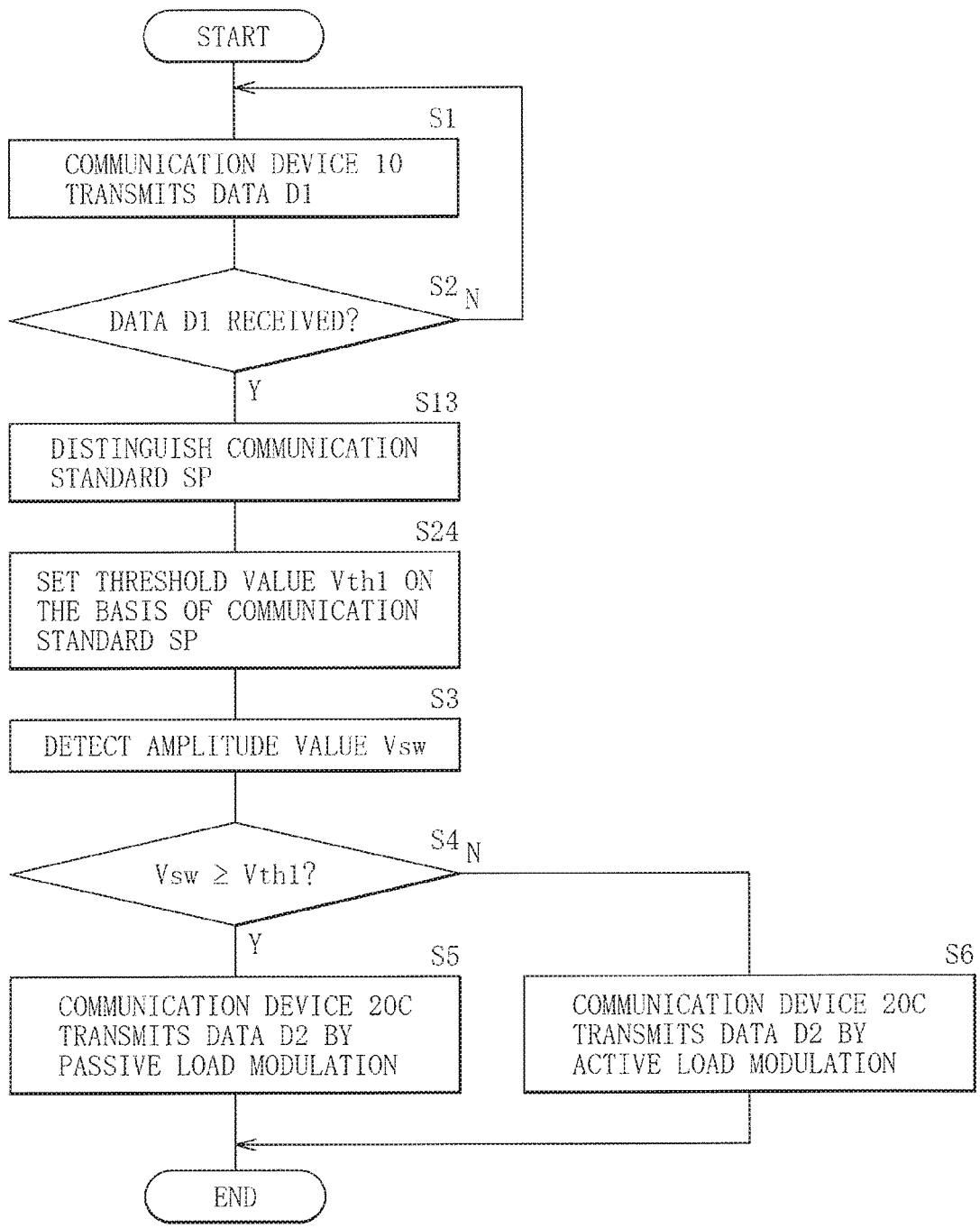
[FIG. 8]

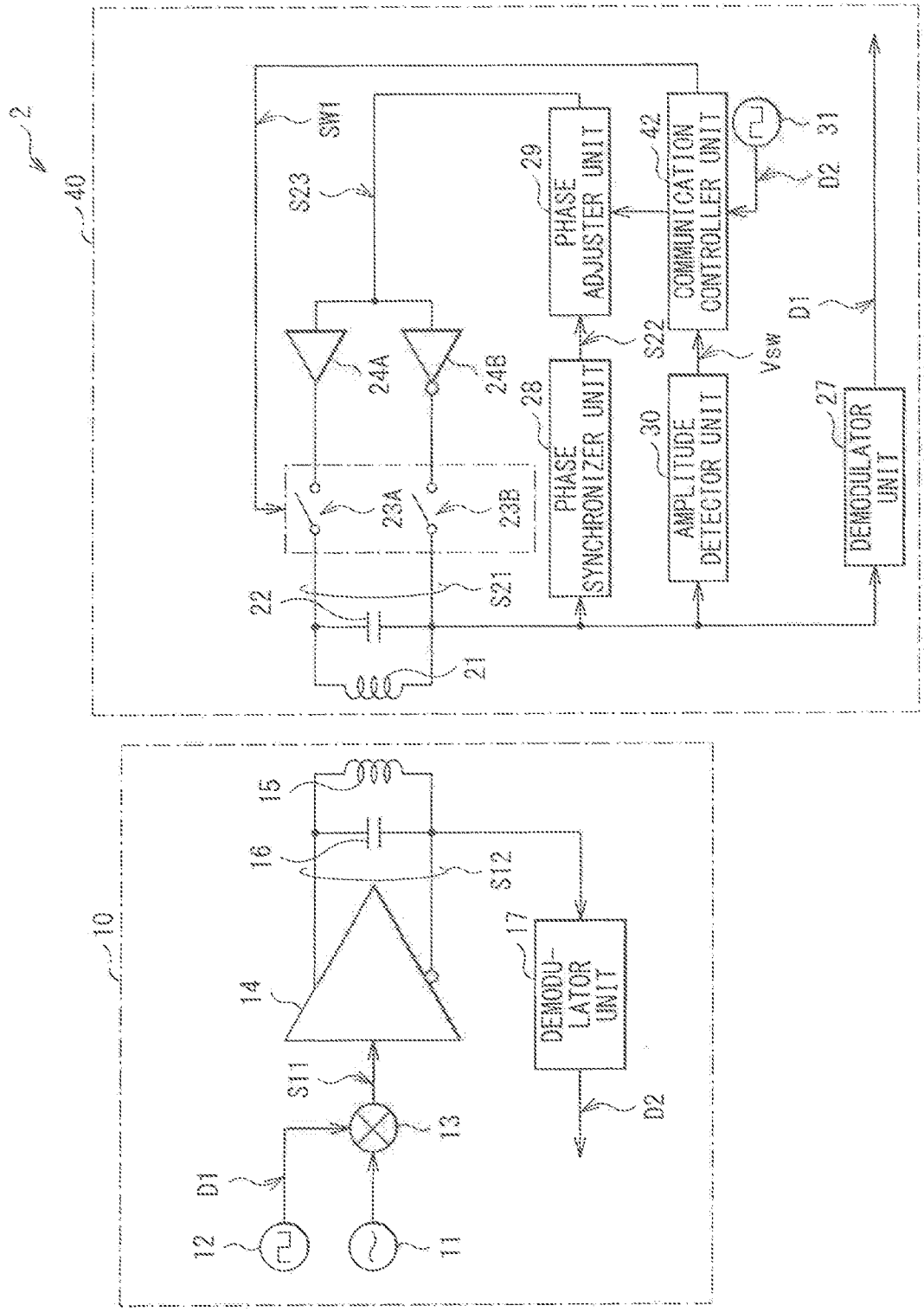
[FIG 9]

[ FIG. 10 ]
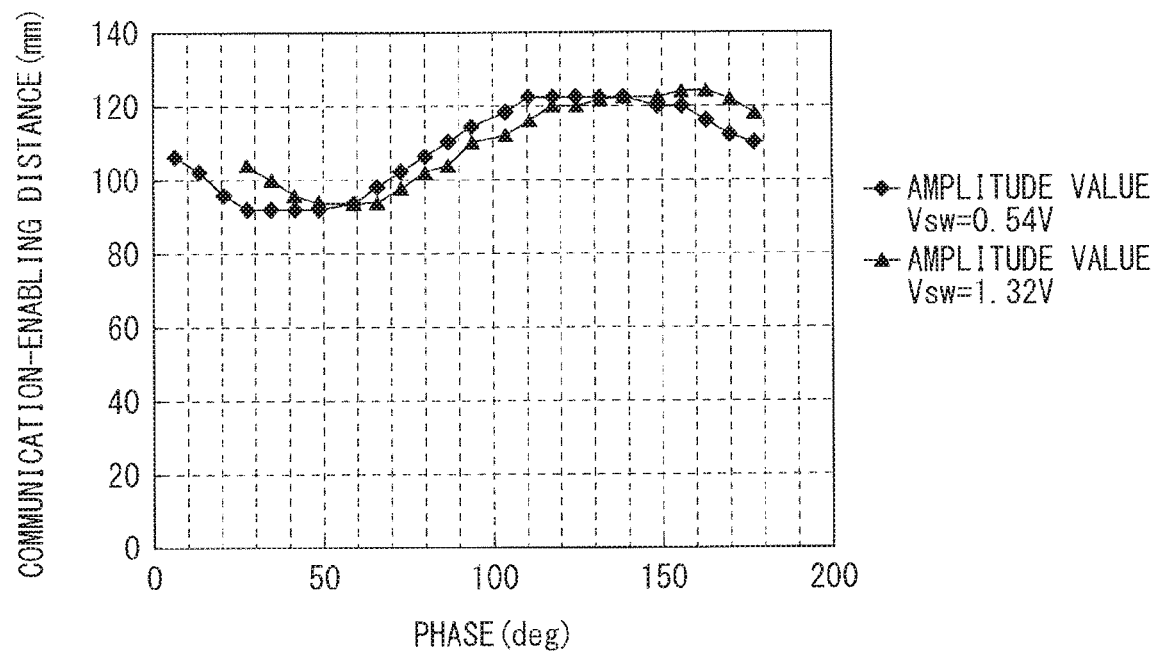

[ FIG. 11 ]
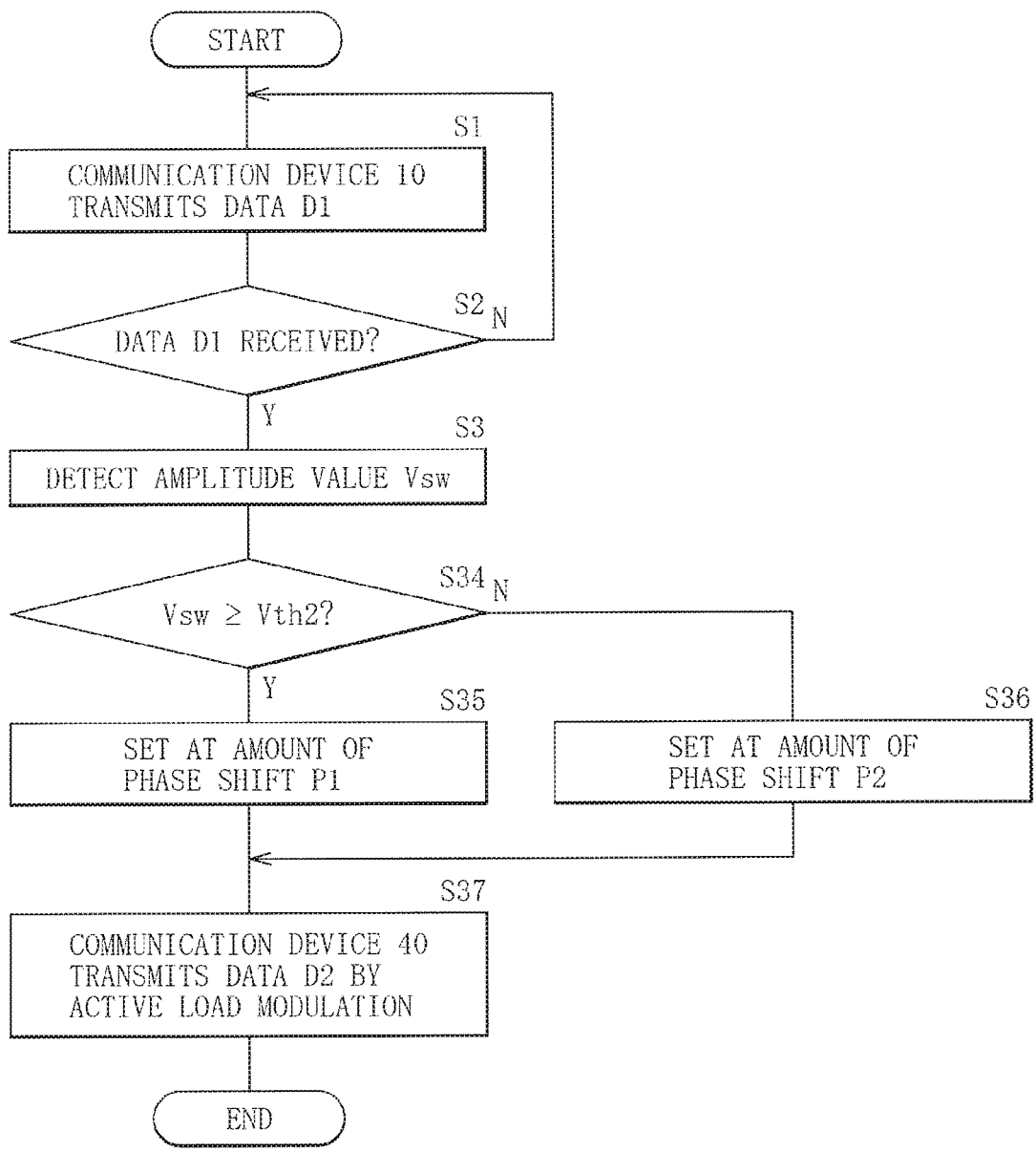

[ FIG. 12 ]
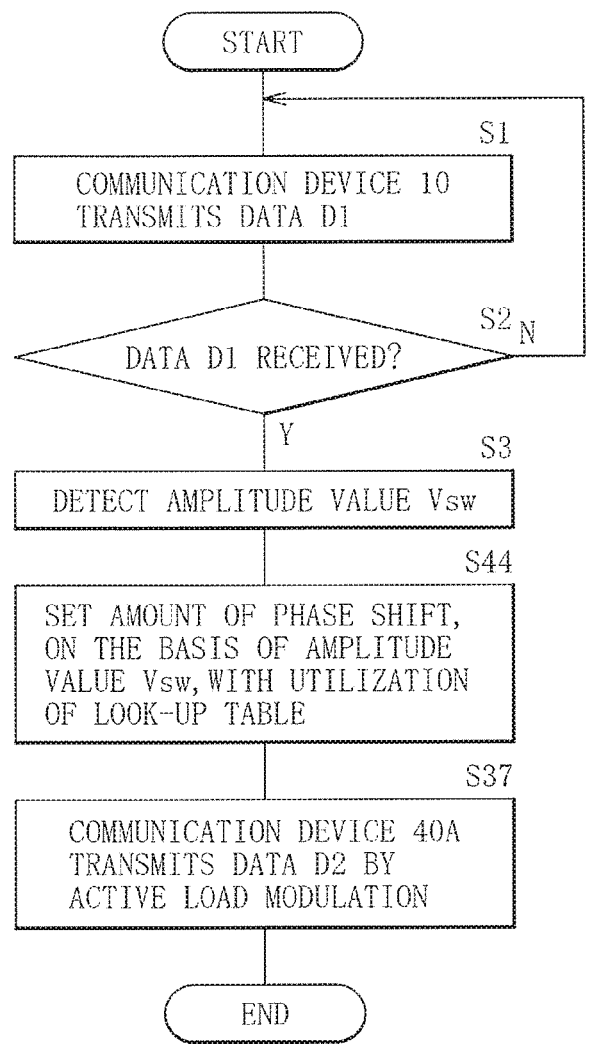

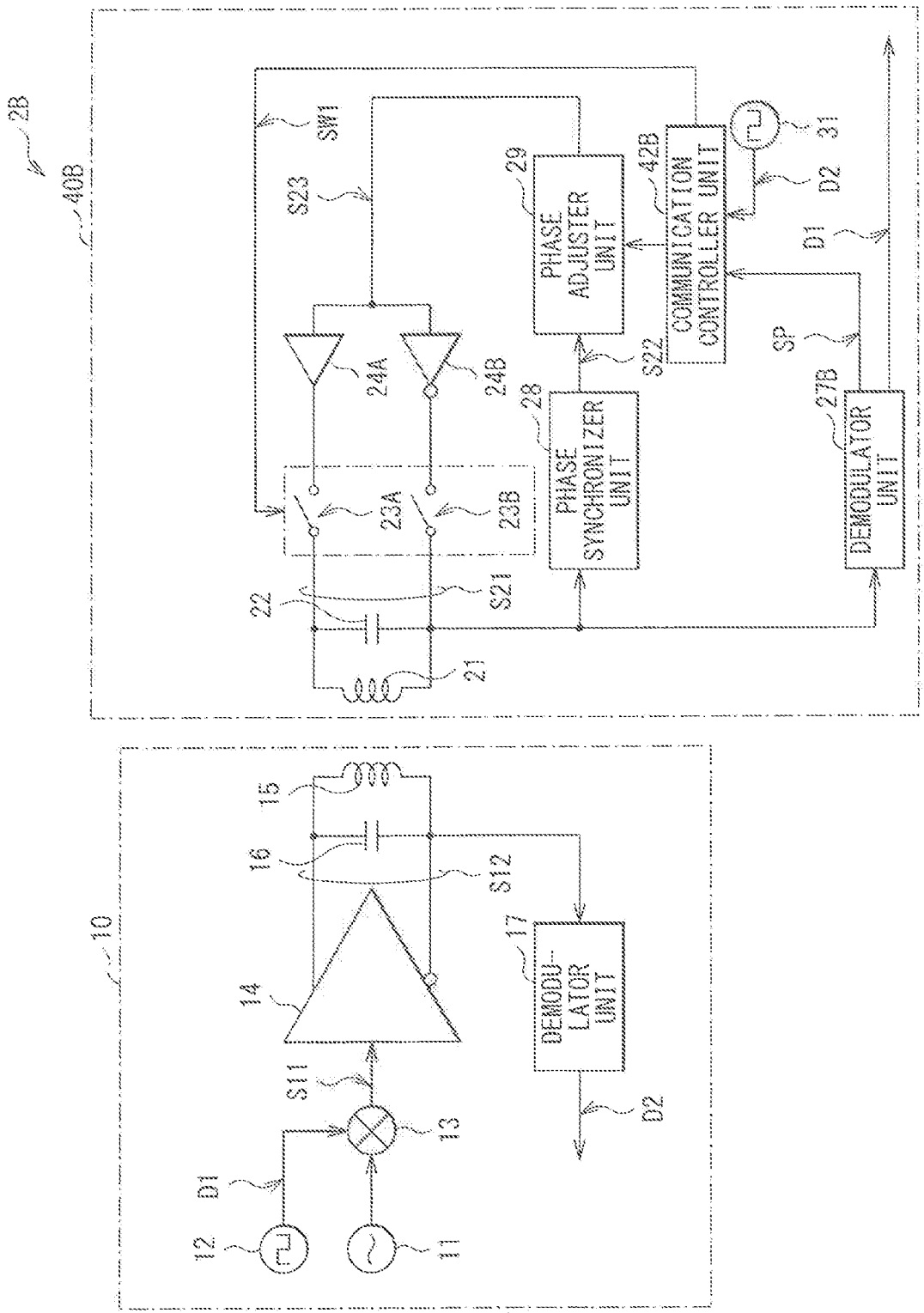
[FIG 13]

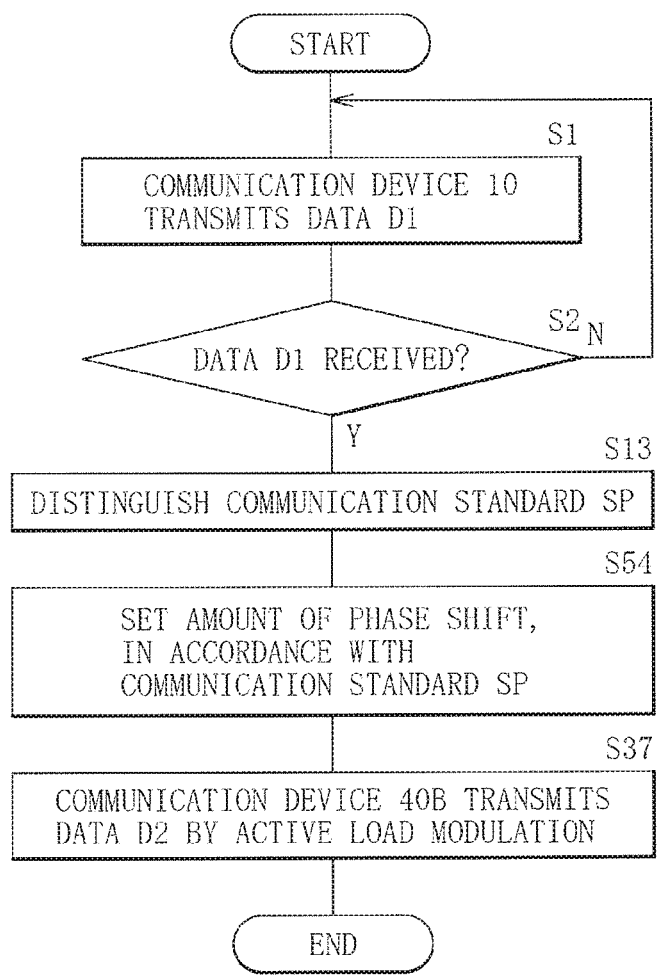
[ FIG.14 ]

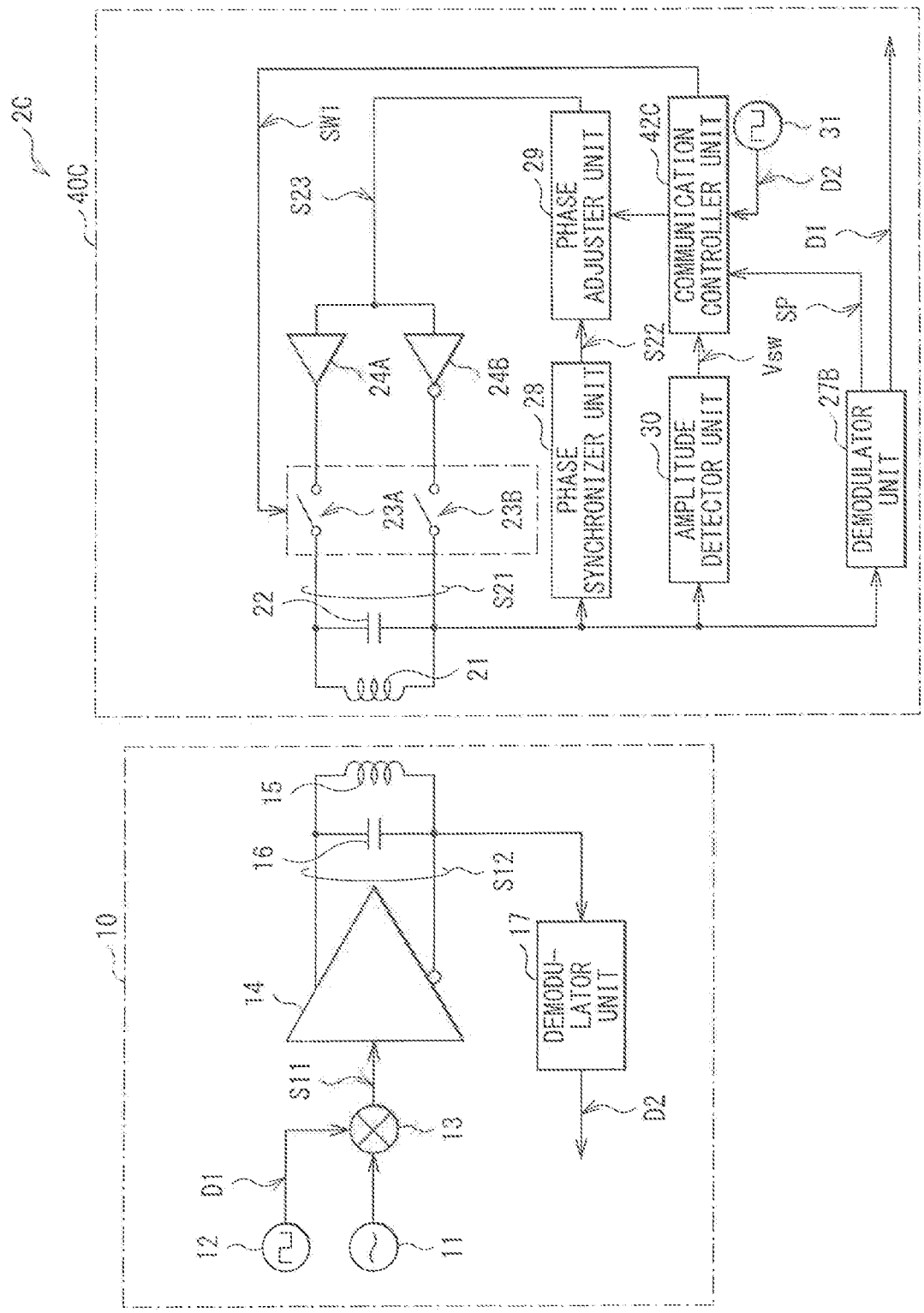
[FIG 15]

[ FIG. 16 ]
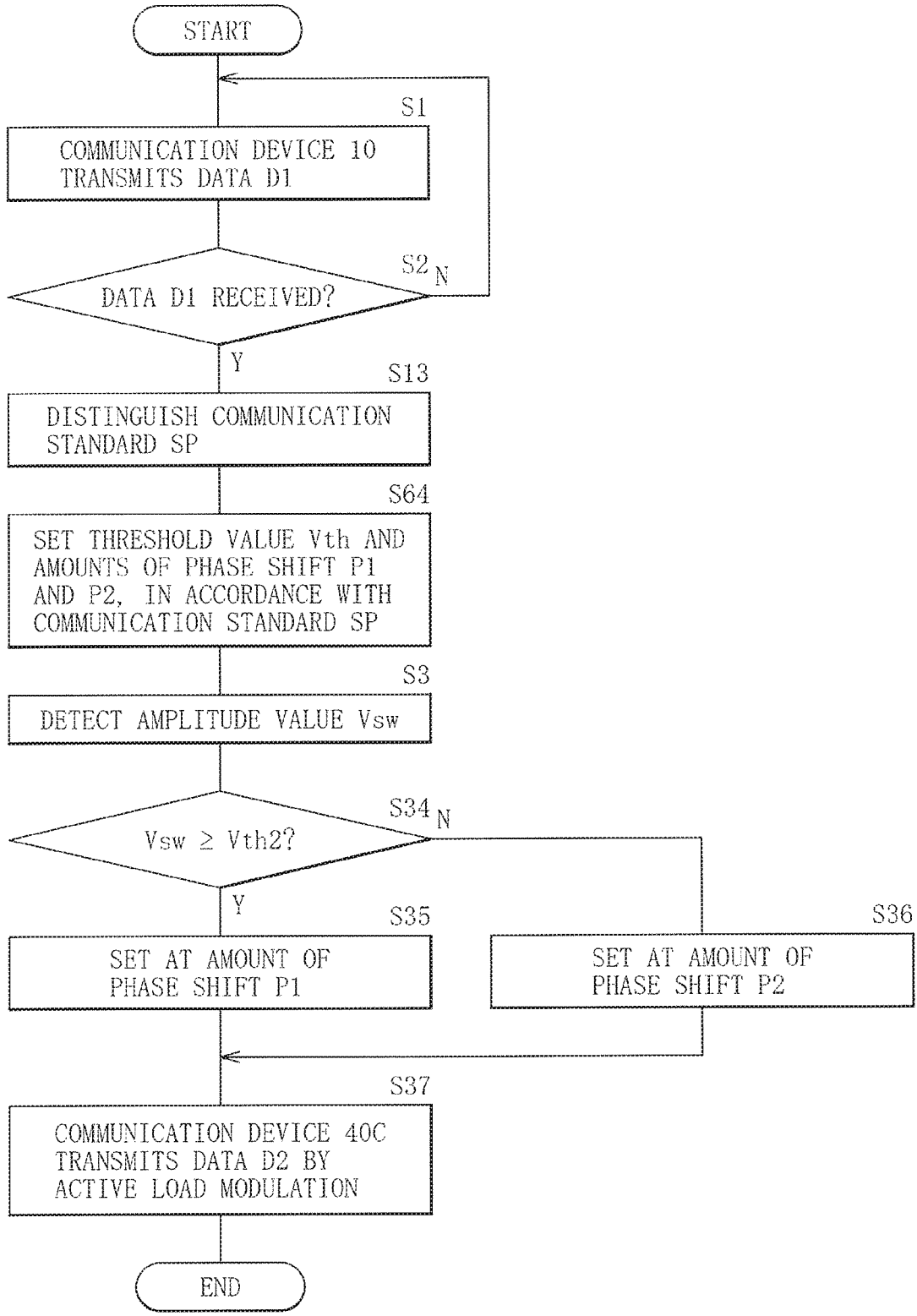

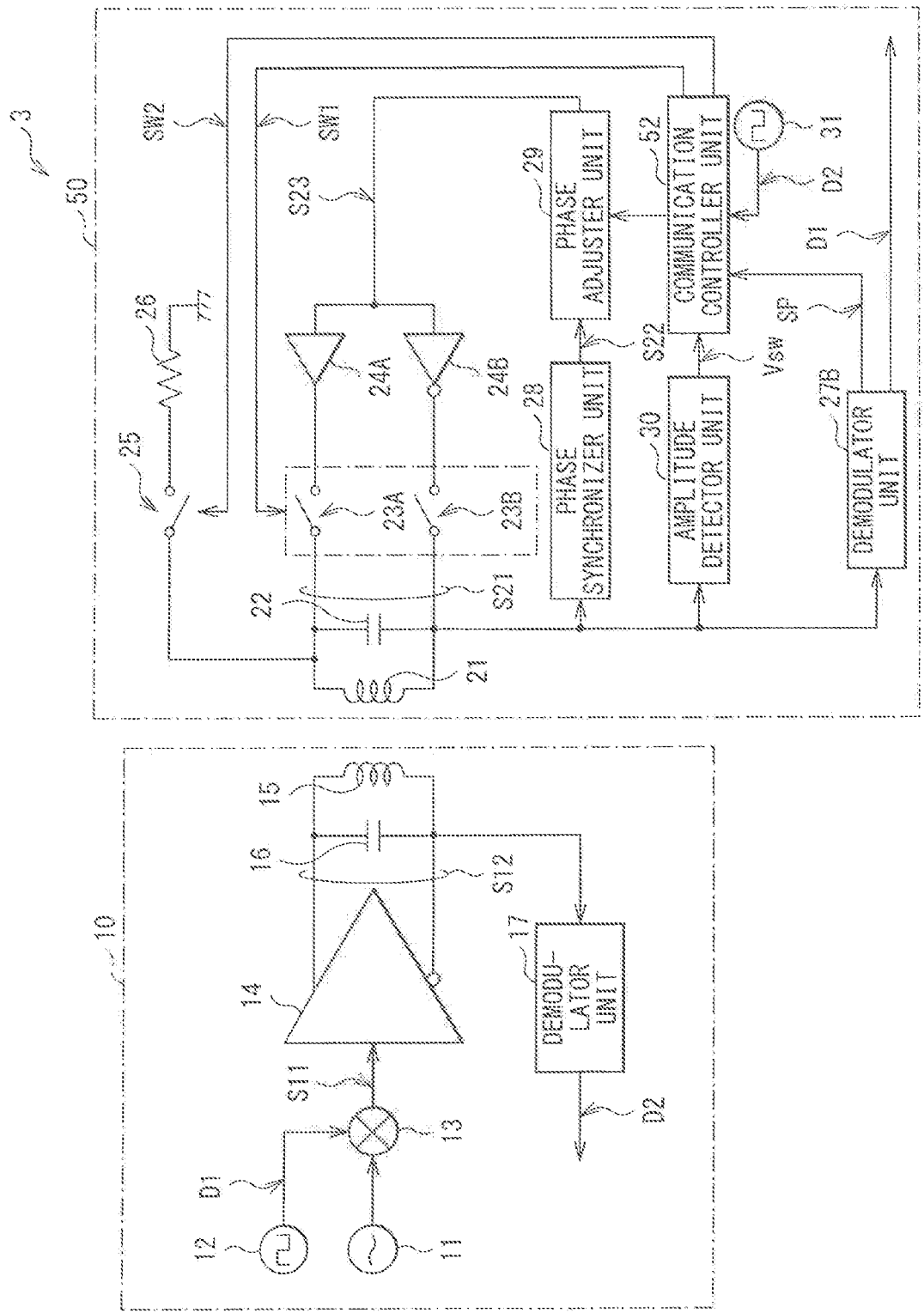
[FIG 17]

[ FIG. 18 ]
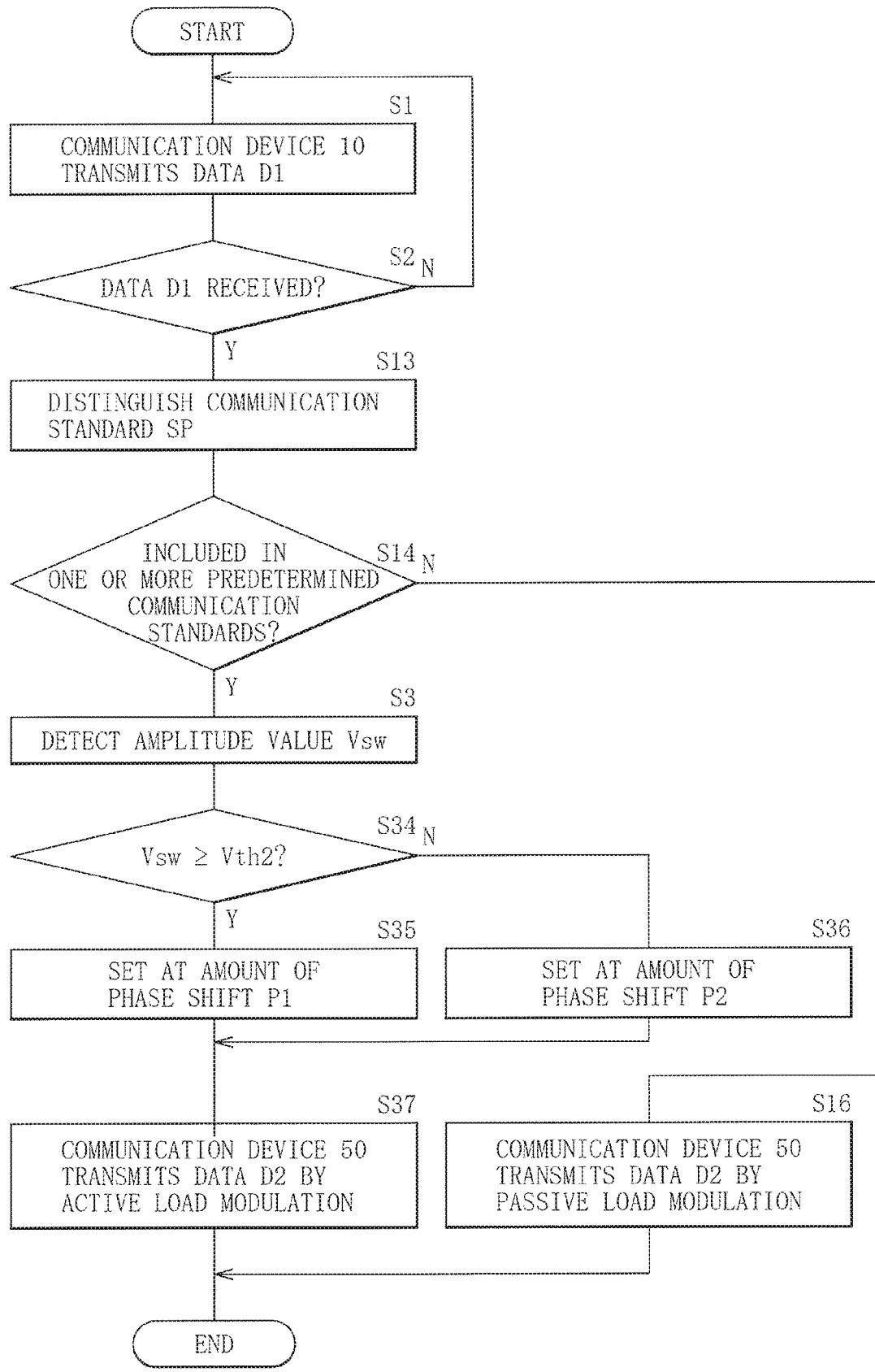

COMMUNICATION DEVICE AND COMMUNICATION METHOD

CROSS REFERENCE TO RELATED APPLICATIONS

This Application is a continuation application of application Ser. No. 15/545,135, filed Jul. 20, 2017, which is a Nationalization of PCT/JP2016/052424, filed Jan. 28, 2016 which claims the benefit of Japanese Priority Patent Application JP2015-53573 filed on Mar. 17, 2015, the entire contents of which are incorporated herein by reference.

TECHNICAL FIELD

The disclosure relates to a communication device utilized in short-range wireless communication (NFC; Near Field Communication), and a communication method utilized for the communication device.

BACKGROUND ART

Short-range wireless communication is a technique spreading mainly in the Asian zone with regard to, for example, traffic systems, billing, and authentication, and is a technique ratified as an international standard. A standard of the short-range wireless communication (hereinbelow also referred to as NFC standard) has compatibility, as so-called backward compatibility, with various standards such as TypeA standard, TypeB standard, FeliCa standard, and ISO15693 standard. In other words, for example, reader writers or cards in conformity with the NFC standard are also in conformity with all these standards.

In the short-range wireless communication, for example, the reader writer transmits data to the card by ASK (Amplitude Shift Keying) modulation. The card transmits data to the reader writer by load modulation. For example, PTLs 1 and 2 disclose communication devices that are able to perform communication by the load modulation (passive load modulation).

CITATION LIST

Patent Literature

PTL 1: Japanese Unexamined Patent Application Publication No. 2013-62605
PTL 2: Japanese Unexamined Patent Application Publication No. 2011-254156

SUMMARY OF THE INVENTION

Now, in general, in communication, higher communication quality is desired, with expectation of further enhancement in communication quality.

It is therefore desirable to provide a communication device and a communication method that make it possible to enhance communication quality.

A first communication device according to an embodiment of the disclosure includes a signal generator, a first modulator, a second modulator, and a communication controller. The signal generator generates, on the basis of a first signal received from a communication partner through a coil, a second signal that synchronizes with the first signal. The first modulator is configured to be able to modulate the first signal on the basis of the second signal. The second modulator is configured to be able to modulate the first signal. The communication controller selects, on the basis of the first signal, whichever modulator is to be operated, from the first modulator and the second modulator.

A second communication device according to an embodiment of the disclosure includes a signal generator, a phase adjuster, and a first modulator. A coil receives a first signal from a communication partner. The signal generator generates, on the basis of a first signal received from a communication partner through a coil, a second signal that synchronizes with the first signal. The phase adjuster adjusts a phase of the second signal on the basis of the first signal. The first modulator is configured to be able to modulate the first signal on the basis of the second signal the phase of which has been adjusted by the phase adjuster.

A first communication method according to an embodiment of the disclosure includes: allowing a coil to receive a first signal from a communication partner; generating, on the basis of the first signal, a second signal that synchronizes with the first signal; and selecting, on the basis of the first signal, whichever modulator is to be operated, from a first modulator and a second modulator. The first modulator is configured to be able to modulate the first signal on the basis of the second signal, and the second modulator is configured to be able to modulate the first signal.

A second communication method according to an embodiment of the disclosure includes: allowing a coil to receive a first signal from a communication partner; generating, on the basis of the first signal, a second signal that synchronizes with the first signal; adjusting a phase of the second signal on the basis of the first signal; and allowing a first modulator to operate. The first modulator is configured to be able to modulate the first signal on the basis of the second signal the phase of which has been adjusted.

In the first communication device and the first communication method according to the embodiments of the disclosure, the first modulator and the second modulator are provided. The first modulator is configured to modulate the first signal on the basis of the second signal that synchronizes with the first signal. Moreover, on the basis of the first signal, whichever modulator operates is selected from the first modulator and the second modulator.

In the second communication device and the second communication method according to the embodiments of the disclosure, the first modulator is provided. The first modulator is configured to modulate the first signal on the basis of the second signal that synchronizes with the first signal. The phase of the second signal is adjusted on the basis of the first signal.

According to the first communication device and the first communication method of the embodiments of the disclosure, the first modulator and the second modulator are provided. On the basis of the first signal, whichever modulator is to be operated is selected from the first modulator and the second modulator. Hence, it is possible to enhance the communication quality.

According to the second communication device and the second communication method of the embodiments of the disclosure, the first modulator is provided. The phase of the second signal is adjusted on the basis of the first signal. Hence, it is possible to enhance the communication quality.

It is to be noted that effects of the disclosure are not necessarily limited to the effects described above, and may include any of effects that are described herein.

BRIEF DESCRIPTION OF DRAWING

FIG. 1 is a block diagram that illustrates one configuration example of a communication system according to a first embodiment of the disclosure.

FIG. 2A is a waveform chart that illustrates one operation example of a phase synchronizer unit illustrated in FIG. 1.

FIG. 2B is a waveform chart that illustrates another operation example of the phase synchronizer unit illustrated in FIG. 1.

FIG. 3 is a schematic diagram provided for description of a concept of active load modulation.

FIG. 4 is a flowchart that illustrates one operation example of the communication system illustrated in FIG. 1.

FIG. 5 is a block diagram that illustrates one configuration example of a communication system according to a modification example of the first embodiment.

FIG. 6 is a flowchart that illustrates one operation example of the communication system illustrated in FIG. 5.

FIG. 7 is a block diagram that illustrates one configuration example of a communication system according to a modification example of the first embodiment.

FIG. 8 is a flowchart that illustrates one operation example of the communication system illustrated in FIG. 7.

FIG. 9 is a block diagram that illustrates one configuration example of a communication system according to a second embodiment.

FIG. 10 is a characteristic diagram that illustrates one example of communication characteristics by the active load modulation.

FIG. 11 is a flowchart that illustrates one operation example of the communication system illustrated in FIG. 9.

FIG. 12 is a flowchart that illustrates one operation example of a communication system according to a modification example of the second embodiment.

FIG. 13 is a block diagram that illustrates one configuration example of a communication system according to a modification example of the second embodiment.

FIG. 14 is a flowchart that illustrates one operation example of the communication system illustrated in FIG. 13.

FIG. 15 is a block diagram that illustrates one configuration example of a communication system according to a modification example of the second embodiment.

FIG. 16 is a flowchart that illustrates one operation example of the communication system illustrated in FIG. 15.

FIG. 17 is a block diagram that illustrates one configuration example of a communication system according to a third embodiment.

FIG. 18 is a flowchart that illustrates one operation example of the communication system illustrated in FIG. 17.

MODES FOR CARRYING OUT THE INVENTION

In the following, some embodiments of the disclosure are described in detail with reference to the drawings. It is to be noted that description is made in the following order.
1. First Embodiment
2. Second Embodiment
3. Third Embodiment 1. First Embodiment Configuration Example FIG. 1 illustrates one configuration example of a communication system 1 including a communication device according to a first embodiment. The communication system 1 performs communication by short-range wireless communication. It is to be noted that since a communication method according to an embodiment of the disclosure is embodied by this embodiment, description thereof is made together.

The communication system 1 includes a communication device 10 and a communication device 20.

The communication device 10 and the communication device 20 perform communication with each other through a magnetic field. Specifically, in the communication system 1, a coil 15 (described later) of the communication device 10 and a coil 21 (described later) of the communication device 20 form coupling through the magnetic field, to transmit or receive data by electromagnetic induction. At this occasion, the communication device 10 transmits, by ASK modulation, data to the communication device 20, and the communication device 20 transmits, by passive load modulation or active load modulation, data to the communication device 10, as described later. The communication device 10 is applied to, for example, a reader writer, and is in conformity with any one of various standards such as TypeA standard, TypeB standard, FeliCa standard, and ISO15693 standard. The communication device 20 is applied to, for example, a card, and is in conformity with NFC standard that has backward compatibility with these standards.

The communication device 10 includes a carrier signal generator unit 11, a data generator unit 12, a modulator unit 13, an amplifier 14, the coil 15, a capacitor 16, and a demodulator unit 17.

The carrier signal generator unit 11 generates a carrier signal. A frequency of the carrier signal is, for example, 13.56 MHz. The data generator unit 12 generates data D1 to be transmitted.

The modulator unit 13 modulates, by the ASK modulation, the carrier signal with the utilization of the data D1, to generate a signal S11. Moreover, the modulator unit 13 keeps from performing the ASK modulation, in a case where the communication device 20 transmits data D2 to the communication device 10.

The amplifier 14 generates a signal S12 on the basis of the signal S11, and outputs the signal S12 as an inter-terminal signal between a first output terminal and a second output terminal. The first output terminal of the amplifier 14 is coupled to one end of the coil 15 and to one end of the capacitor 16. The second output terminal of the amplifier 14 is coupled to another end of the coil 15 and to another end of the capacitor 16.

The coil 15 generates the magnetic field on the basis of the signal S12, and forms coupling to the coil 21 (described later) of the communication device 20 through the magnetic field. The one end of the coil 15 is coupled to the first output terminal of the amplifier 14 and to the one end of the capacitor 16, whereas the other end is coupled to the second output terminal of the amplifier 14 and to the other end of the capacitor 16. The one end of the capacitor 16 is coupled to the one end of the coil 15 and to the first output terminal of the amplifier 14, whereas the other end is coupled to the other end of the coil 15 and to the second output terminal of the amplifier 14.

The demodulator unit 17 performs demodulating operation on the basis of a voltage signal at the other end of the coil 15, to receive the data D2 transmitted from the communication device 20. The demodulator unit 17 is constituted by, for example, a so-called I/Q (In-phase/Quadrature) demodulator. In the communication system 1, the communication device 20 performs communication by load modulation, in transmitting data to the communication device 10. Specifically, in a period when the communication device 10 transmits the carrier signal to the communication device 20, a communication controller unit 32 (described later) of the communication device 20 changes, in accordance with the data D2 to be transmitted, a load viewed from the communication device 10. The change in the load appears, in the communication device 10, as, for example, a change in amplitude or a phase of the voltage signal at the other end of the coil 15. The demodulator unit 17 detects the amplitude or the phase of the voltage signal at the other end of the coil 15, to receive the data D2 transmitted from the communication device 20. Moreover, the demodulator unit 17 supplies the data D2 to other blocks in the communication device 10.

It is to be noted that in this example, the demodulator unit 17 operates on the basis of the voltage signal at the other end of the coil 15, but this is non-limiting. For example, the demodulator unit 17 may operate on the basis of a voltage signal at the one end of the coil 15, or alternatively, the demodulator unit 17 may operate on the basis of a voltage signal between both the ends of the coil 15.

The communication device 20 includes the coil 21, a capacitor 22, switches 23A and 23B, amplifiers 24A and 24B, a switch 25, a resistor 26, a demodulator unit 27, a phase synchronizer unit 28, a phase adjuster unit 29, an amplitude detector unit 30, a data generator unit 31, and the communication controller unit 32.

The coil 21 forms coupling to the coil 15 of the communication device 10 through the magnetic field, and generates, by the electromagnetic induction, a signal S21 corresponding to the signal S12 in the communication device 10. One end of the coil 21 is coupled to one end of the capacitor 22, to one end of the switch 23A, and to one end of the switch 25. Another end of the coil 21 is coupled to another end of the capacitor 22 and to one end of the switch 23B. The one end of capacitor 22 is coupled to the one end of the coil 21, to the one end of the switch 23A, and to the one end of the switch 25, whereas the other end is coupled to the other end of the coil 21 and to the one end of the switch 23B.

The one end of the switch 23A is coupled to the one end of the coil 21, to the one end of the capacitor 22, and to the one end of the switch 25, whereas another end is coupled to an output terminal of the amplifier 24A. The one end of the switch 23B is coupled to the other end of the coil 21 and to the other end of the capacitor 22, whereas another end is coupled to an output terminal of the amplifier 24B. The switches 23A and 23B are turned on and off on the basis of a switch control signal SW1.

The amplifier 24A amplifies an output signal (a signal S23) of the phase adjuster unit 29, and outputs the signal amplified. The amplifier 24B inverts and amplifies the output signal (the signal S23) of the phase adjuster unit 29, and outputs the signal inverted and amplified.

With this configuration, in the communication device 20, as described later, turning on and off the switches 23A and 23B causes the active load modulation to be performed.

The one end of the switch 25 is coupled to the one end of the coil 21, whereas another end is coupled to one end of the resistor 26. The switch 25 is turned on and off, on the basis of a switch control signal SW2. The one end of the resistor 26 is coupled to the other end of the switch 25, whereas another end is grounded. With this configuration, in the communication device 20, as described later, turning on and off the switch 25 causes the passive load modulation to be performed.

The demodulator unit 27 performs the demodulating operation on the basis of a voltage signal at the other end of the coil 21, to receive the data D1 transmitted from the communication device 10. The demodulator unit 27 is constituted by an ASK demodulator. Moreover, the demodulator unit 27 supplies the data D1 to other blocks in the communication device 20.

The phase synchronizer unit 28 generates, on the basis of the voltage signal at the other end of the coil 21, a signal S22 that synchronizes with the voltage signal. The phase synchronizer unit 28 is constituted with the utilization of a PLL (Phase Locked Loop).

FIGS. 2A and 2B illustrate one operation example of the phase synchronizer unit 28. FIG. 2A illustrates operation in a case where a communication distance from the communication device 10 to the communication device 20 is short. FIG. 2B illustrates operation in a case where the communication distance is long. In the case with the short communication distance, a coupling coefficient of the coil 15 of the communication device 10 and the coil 21 of the communication device 20 becomes large, causing an increase in amplitude of the signal S21. Meanwhile, in the case with the long communication distance, the coupling coefficient of the coil 15 and the coil 21 becomes small, causing a decrease in the amplitude of the signal S21. The phase synchronizer unit 28 generates, regardless of the amplitude of the signal S21, on the basis of the voltage signal at the other end of the coil 21, the signal S22 that synchronizes with the voltage signal.

The phase adjuster unit 29 adjusts a phase of the signal S22 by an amount of a phase shift in accordance with an instruction from the communication controller unit 32, and outputs, as the signal S23, a signal whose phase has been adjusted. The phase adjuster unit 29 may be constituted with the utilization of, for example, a variable delay circuit. It is to be noted that this is non-limiting, but the phase adjuster unit 29 may be constituted by anything that is able to make phase adjustments.

The amplitude detector unit 30 detects, on the basis of the voltage signal at the other end of the coil 21, an amplitude value $V_{SW}$ of the voltage signal. As described above, because the amplitude of the signal S21 changes with the communication distance from the communication device 10 to the communication device 20, the amplitude of the voltage signal at the other end of the coil 21 also changes in a similar manner in accordance with the communication distance. Accordingly, the amplitude detector unit 30 detects the amplitude value $V_{SW}$ of the voltage signal, and supplies a detection result to the communication controller unit 32.

It is to be noted that in this example, the demodulator unit 27, the phase synchronizer unit 28, and the amplitude detector unit 30 operate on the basis of the voltage signal at the other end of the coil 21, but this is non-limiting. For example, the demodulator unit 27, the phase synchronizer unit 28, and the amplitude detector unit 30 may operate on the basis of a voltage signal at the one end of the coil 21, or alternatively, the demodulator unit 27, the phase synchronizer unit 28, and the amplitude detector unit 30 may operate on the basis of a voltage signal between both the ends of the coil 21.

The data generator unit 31 generates the data D2 to be transmitted, and supplies the data D2 to the communication controller unit 32.

The communication controller unit 32 generates the switch control signals SW1 and SW2 on the basis of the amplitude value $V_{SW}$ and on the basis of the data D2. The communication controller unit 32 supplies the switch control signal SW1 to the switches 23A and 23B, while supplying the switch control signal SW2 to the switch 25. Specifically, the communication controller unit 32 turns on and off the switch 25 in accordance with the data D2, in a case where the amplitude value $V_{SW}$ is equal to or larger than a predetermine threshold value Vth1. In other words, in this case, the communication device 20 utilizes the passive load modulation, in transmitting the data D2. Moreover, the communication controller unit 32 turns on and off the switches 23A and 23B in accordance with the data D2, in a case where the amplitude value $V_{SW}$ is smaller than the predetermine threshold value Vth1. In other words, in this case, the communication device 20 utilizes the active load modulation, in transmitting the data D2.

Furthermore, the communication controller unit 32 has a function of setting the amount of the phase shift in the phase adjuster unit 29. Hence, in the communication device 20, as described later, it is possible to increase the communication distance, in transmitting the data D2 to the communication device 10 by the active load modulation.

Here, the communication device 20 corresponds to one specific example of a "communication device" in the disclosure. The phase synchronizer unit 28 corresponds to one specific example of a "signal generator" in the disclosure. The amplifiers 24A and 24B, and the switches 23A and 23B correspond to one specific example of a "first modulator" in the disclosure. The switch 25 corresponds to one specific example of a "second modulator" in the disclosure. The amplitude detector unit 30 and the communication controller unit 32 correspond to one specific example of a "communication controller" in the disclosure.

[Operation and Workings]

Description is given next of operation and workings of the communication system 1 according to this embodiment.

[Outline of Overall Operation]

First, an outline of overall operation of the communication system 1 is described with reference to FIG. 1.

The communication device 10 transmits, by the ASK modulation, the data D1 to the communication device 20. Specifically, first, in the communication device 10, the carrier signal generator unit 11 generates the carrier signal, and the data generator unit 12 generates the data D1 to be transmitted. The modulator unit 13 modulates, by the ASK modulation, the carrier signal with the utilization of the data D1, to generate the signal S11. The amplifier 14 generates the signal S12 on the basis of the signal S11. The coil 15 generates the magnetic field on the basis of the signal S12. In the communication device 20, the coil 21 generates the signal S21 on the basis of the magnetic field generated by the coil 15. The demodulator unit 27 performs the demodulating operation on the basis of the voltage signal at the other end of the coil 21, to receive the data D1 transmitted from the communication device 10.

The communication device 20 transmits, by the load modulation, the data D2 to the communication device 10. Specifically, first, in the period when the communication device 10 transmits the carrier signal to the communication device 20, the amplitude detector unit 30 detects the amplitude value $V_{SW}$ of the voltage signal at the other end of the coil 21. The phase synchronizer unit 28 generates, on the basis of the voltage signal at the other end of the coil 21, the signal S22 that synchronizes with the voltage signal. The phase adjuster unit 29 adjusts the phase of the signal S22 by the amount of the phase shift in accordance with the instruction from the communication controller unit 32, and outputs, as the signal S23, the signal whose phase has been adjusted. The communication controller unit 32 generates the switch control signals SW1 and SW2 on the basis of the amplitude value $V_{SW}$ and on the basis of the data D2. The communication controller unit 32 supplies the switch control signal SW1 to the switches 23A and 23B, while supplying the switch control signal SW2 to the switch 25. Thus, the load viewed from the communication device 10 changes in accordance with the data D2. The demodulator unit 17 of the communication device 10 performs the demodulating operation on the basis of the voltage signal at the other end of the coil 15, to receive the data D2 transmitted from the communication device 20.

[Regarding Load Modulation]

The communication device 20 transmits, by the load modulation, the data D2 to the communication device 10. At this occasion, the communication controller unit 32 selects, on the basis of the amplitude value $V_{SW}$, either the passive load modulation or the active load modulation.

In the passive load modulation, in the period when the communication device 10 transmits the carrier signal to the communication device 20, the communication controller unit 32 turns on and off the switch 25 in accordance with the data D2. Upon the switch 25 being turned on, the one end of the coil 21 is grounded through the resistor 26. This causes the load viewed from the communication device 10 to change in accordance with the data D2. The demodulator unit 17 of the communication device 10 performs the demodulating operation on the basis of the change in the load, to receive the data D2 transmitted from the communication device 20.

In the active load modulation, in the period when the communication device 10 transmits the carrier signal to the communication device 20, the communication controller unit 32 turns on and off the switches 23A and 23B in accordance with the data D2. Upon the switches 23A and 23B being turned on, the output signal of the amplifier 24A is supplied to the one end of the coil 21, while the output signal of the amplifier 24B is supplied to the other end of the coil 21. In other words, a signal that synchronizes with the carrier signal is supplied to between both the ends of the coil 21. This causes the coil 21 to generate the magnetic field. Thus, in the active load modulation, unlike the passive load modulation, the coil 21 is directly supplied with the signal W2 that synchronizes with the carrier signal, causing the magnetic field to change significantly. This causes the load viewed from the communication device 10 to change in accordance with the data D2. On the basis of the change in the load, the demodulator unit 17 of the communication device 10 performs the demodulating operation, to receive the data D2 transmitted from the communication device 20.

FIG. 3 schematically illustrates operation of the active load modulation. The coil 15 of the communication device 10 generates the magnetic field on the basis of the carrier signal W1. The coil 21 of the communication device 20 generates the magnetic field on the basis of the signal W2 that synchronizes with the carrier signal, in a period when the switches 23A and 23B are turned on. Moreover, the demodulator unit 17 of the communication device 10 performs the demodulating operation on the basis of a composite signal W3 of the carrier signal W1 and the signal W2. The composite signal W3 may be represented as follows.

[Expression 1]

$$A \sin(\omega t) + B \sin(\omega t + \theta) = \sqrt{A^2 + B^2 + 2AB\cos\theta} \sin(\theta + \phi) \quad (1)$$

Here, a first term of a left side denotes the carrier signal W1. A second term of the left side denotes the signal W2. Thus, the composite signal W3 may be represented with the utilization of a composite theorem of a sine wave. Adjusting the amount of the phase shift in the phase adjuster unit 29 of the communication device 20 makes it possible to adjust a phase θ in the expression (1). Hence, in the active load modulation, it is possible to increase amplitude of the composite signal W3, leading to an increase in a degree of modulation. As described, in the communication system 1, setting the amount of the phase shift in the phase adjuster unit 29 at an appropriate value makes it possible to increase the communication distance from the communication device 10 to the communication device 20.

[Detailed Operation]

FIG. 4 illustrates one operation example of the communication system 1. In the communication system 1, first, the communication device 10 transmits the data D1 to the communication device 20. Moreover, the communication device 20 transmits the data D2 to the communication device 10, to make a response. In the following, this operation is described in detail.

First, the communication device 10 transmits, by the ASK modulation, the data D1 to the communication device 20 (step S1).

Thereafter, the demodulator unit 27 of the communication device 20 makes a confirmation as to whether or not the demodulator unit 27 has received the data D1 (step S2). In a case where the demodulator unit 27 has received the data D1, the data generator unit 31 of the communication device 20 generates the data D2 for the response to the communication device 10, and the flow proceeds to step S3. Moreover, in a case where the demodulator unit 27 has failed in receiving the data D1, the flow returns to step S1, and repeats the steps S1 and S2 until reception.

Thereafter, the amplitude detector unit 30 of the communication device 20 detects the amplitude value $V_{SW}$ of the voltage signal at the other end of the coil 21 (step S3).

Thereafter, the communication controller unit 32 of the communication device 20 compares the amplitude value $V_{SW}$ detected in step S3 with the predetermined threshold value Vth1 (step S4). In a case where the amplitude value $V_{SW}$ is equal to or larger than the threshold value Vth1 ($V_{SW} \geq $ Vth1), the communication device 20 transmits, by the passive load modulation, the data D2 to the communication device 10 (step S5). Specifically, the communication controller unit 32 turns on and off the switch 25 with the utilization of the switch control signal SW2, in accordance with the data D2. In other words, in the case where the amplitude value $V_{SW}$ is equal to or larger than the threshold value Vth1, the communication controller unit 32 determines that the communication distance from the communication device 10 to the communication device 20 is short, and selects the passive load modulation.

Meanwhile, in step S4, in a case where the amplitude value $V_{SW}$ is smaller than the threshold value Vth1 ($V_{SW}<$ Vth1), the communication device 20 transmits, by the passive load modulation, the data D2 to the communication device 10 (step S6). Specifically, the communication controller unit 32 turns on and off the switches 23A and 23B with the utilization of the switch control signal SW1, in accordance with the data D2. In other words, in the case where the amplitude value $V_{SW}$ is smaller than the threshold value Vth1, the communication controller unit 32 determines that the communication distance from the communication device 10 to the communication device 20 is long, and selects the active load modulation.

Thus, the flow ends.

As described, in the communication system 1, a configuration is made to be able to select either the passive load modulation or the active load modulation. Hence, it is possible to enhance communication quality.

Specifically, in the communication device 20, in the case where the amplitude value $V_{SW}$ is equal to or larger than the threshold value Vth1, the determination is made that the communication distance from the communication device 10 to the communication device 20 is short. Thus, the passive load modulation is selected. In other words, in the case with the short communication distance, there is no necessity of using the active load modulation that allows for the increase in the communication distance. Accordingly, the passive load modulation is selected. Hence, in the communication system 1, it is possible to reduce possibility of occurrence of erroneous operation. In other words, for example, in a case where the active load modulation is utilized with the communication distance being short, the magnetic field becomes too strong, contributing to the possibility of the occurrence of the erroneous operation in the communication device 10. In contrast, in the communication system 1, the passive load modulation is utilized in the case with the short communication distance. This makes it possible to restrain the strength of the magnetic field, leading to reduction in the possibility of the occurrence of the erroneous operation. As a result, in the communication system 1, it is possible to enhance the communication quality in the case with the short communication distance.

Moreover, in the communication device 20, in the case where the amplitude value $V_{SW}$ is smaller than the threshold value Vth1, the determination is made that the communication distance from the communication device 10 to the communication device 20 is long. Thus, the active load modulation is selected. This makes it possible to perform communication even in a case where the communication device 10 and the communication device 20 are spaced away. As a result, in the communication system 1, it is possible to enhance the communication quality in the case with the long communication distance.

[Effects]

As described, in this embodiment, the configuration is made to be able to select either the passive load modulation or the active load modulation. Hence, it is possible to enhance the communication quality.

Modification Example 1

In the forgoing embodiment, either the passive load modulation or the active load modulation is selected on the basis of the amplitude value $V_{SW}$, but this is non-limiting. In the following, this modification example is described in detail by giving some examples.

FIG. 5 illustrates one configuration example of a communication system 1B according to this modification example. The communication system 1B includes a communication device 20B. The communication device 20B includes a demodulator unit 27B and a communication controller unit 32B.

The demodulator unit 27B performs the demodulating operation on the basis of the voltage signal at the other end of the coil 21, to receive the data D1 transmitted from the communication device 10, as with the demodulator unit 27 according to the forgoing embodiment. Moreover, the demodulator unit 27B distinguishes a standard with which the communication device 10 is in conformity (a communication standard SP), and supplies a distinction result to the communication controller unit 32. An example of distinction methods may be to utilize the degree of the modulation of a signal transmitted from the communication device 10. In other words, as described above, the communication device 10 is in conformity with any one of the various standards such as the TypeA standard, the TypeB standard, the FeliCa standard, and the ISO15693 standard. The modulator unit 13 of the communication device 10 performs the ASK modulation at the degree of the modulation corresponding to the standard with which the communication device 10 is in conformity. Accordingly, the demodulator unit 27B is able to distinguish, on the basis of the degree of the modulation of the signal transmitted from the communication device 10, the standard with which the communication device 10 is in conformity (the communication standard SP). It is to be noted that this is non-limiting. The demodulator unit 27B may distinguish the communication standard SP on the basis of, for example, other features of the signal (coding, a bit rate, and/or a sub carrier). Moreover, in a case where information in accordance with the communication standard SP is included in the data D1 transmitted by the communication device 10, the demodulator unit 27B may distinguish the communication standard SP on the basis of the information.

The communication controller unit 32B generates the switch control signals SW1 and SW2 on the basis of the communication standard SP and on the basis of the data D2. Specifically, the communication controller unit 32B turns on and off the switches 23A and 23B in accordance with the data D2, in a case where the communication standard SP is included in one or more communication standards set in advance. In other words, in this case, the communication device 20B utilizes the active load modulation. Here, the one or more communication standards set in advance are, for example, standards utilized in applications with the long communication distances, and may include, for example, the FeliCa standard. Moreover, the communication controller unit 32B turns on and off the switch 25 in accordance with the data D2, in a case where the communication standard SP is not included in the one or more communication standards. In other words, in this case, the communication device 20B utilizes the passive load modulation.

Here, the demodulator unit 27B and the communication controller unit 32B correspond to one specific example of the "communication controller" in the disclosure.

FIG. 6 illustrates one operation example of the communication system 1B.

First, as with the case of the communication system 1 (FIG. 4), the communication device 10 transmits, by the ASK modulation, the data D1 to the communication device 20B (step S1). The demodulator unit 27B of the communication device 20B makes the confirmation as to whether or not the demodulator unit 27B has received the data D1 (step S2).

Thereafter, the demodulator unit 27B of the communication device 20B distinguishes the communication standard SP (step S13).

Thereafter, the communication controller unit 32B of the communication device 20B makes a confirmation as to whether or not the communication standard SP distinguished in step S13 is included in the one or more predetermined communication standards set in advance (step S14). In a case where the communication standard SP is included in the one or more predetermined communication standards, the communication device 20B transmits, by the active load modulation, the data D2 to the communication device 10 (step S15). Meanwhile, in a case where the communication standard SP is not included in the one or more predetermined communication standards, the communication device 20B transmits, by the passive load modulation, the data D2 to the communication device 10 (step S16).

Thus, the flow ends.

As described, in the communication system 1B, the active load modulation is selected in the case where the communication standard SP is included in the one or more predetermined communication standards that are utilized in the applications with the long communication distances. The passive load modulation is selected in the case where the communication standard SP is not included in the one or more predetermined communication standards. Hence, it is possible to enhance the communication quality.

FIG. 7 illustrates one configuration example of another communication system 1C according to this modification example. The communication system 1C includes a communication device 20C. The communication device 20C includes the demodulator unit 27B and a communication controller unit 32C. The communication controller unit 32C generates the switch control signals SW1 and SW2 on the basis of the amplitude value $V_{SW}$, the communication standard SP, and the data D2. Specifically, first, the communication controller unit 32C sets the predetermined threshold value Vth1 on the basis of the communication standard SP. The threshold value Vth1 is set at a larger value, as the communication distance for the communication standard SP is shorter. For example, because the TypeB standard is a standard that involves performing communication at a shorter distance than those of the TypeA standard and the FeliCa standard, the threshold value Vth1 is set at a large value. Moreover, the communication controller unit 32C turns on and off the switch 25 in accordance with the data D2, in the case where the amplitude value $V_{SW}$ is equal to or larger than the predetermined threshold value Vth1. In other words, in this case, the communication device 20C utilizes the passive load modulation. Meanwhile, the communication controller unit 32C turns on and off the switches 23A and 23B in accordance with the data D2, in the case where the amplitude value $V_{SW}$ is smaller than the predetermined threshold value Vth1. In other words, in this case, the communication controller unit 32C utilizes the active load modulation.

Here, the amplitude detector unit 30, the demodulator unit 27B, and the communication controller unit 32C correspond to one specific example of the "communication controller" in the disclosure.

FIG. 8 illustrates one operation example of the communication system 1C.

First, as with the case of the communication system 1B (FIG. 6), the communication device 10 transmits, by the ASK modulation, the data D1 to the communication device 20 (step S1). The demodulator unit 27B of the communication device 20C makes the confirmation as to whether or not the demodulator unit 27B has received the data D1 (step S2).

Thereafter, the demodulator unit 27B of the communication device 20C distinguishes the communication standard SP (step S13).

Thereafter, the communication controller unit 32C of the communication device 20C sets the threshold value Vth1 on the basis of the communication standard SP distinguished in step S13 (step S24).

Thereafter, the amplitude detector unit 30 of the communication device 20C detects the amplitude value $V_{SW}$ of the voltage signal at the other end of the coil 21 (step S3).

Thereafter, the communication controller unit 32C of the communication device 20C compares the amplitude value $V_{SW}$ detected in step S3 with the predetermined threshold value Vth1 (step S4). In the case where the amplitude value $V_{SW}$ is equal to or larger than the threshold value Vth1 ($V_{SW} \geq \text{Vth1}$), the communication device 20 transmits, by the passive load modulation, the data D2 to the communication device 10 (step S5). Meanwhile, in the case where the amplitude value $V_{SW}$ is smaller than the threshold value Vth1 ($V_{SW} < \text{Vth1}$), the communication device 20 transmits, by the passive load modulation, the data D2 to the communication device 10 (step S6).

Thus, the flow ends.

As described, in the communication system 1C, the threshold value Vth1 is set on the basis of the communication standard SP. Hence, it is possible to enhance the communication quality. In other words, the standards such as the TypeA standard, the TypeB standard, the FeliCa standard, and the ISO15693 standard differ in communication performance from one another, and therefore differ in upper limits of the communication distances that allow for communication by the passive load modulation. Specifically, for example, because the TypeB standard is a standard for the short communication distance, it is necessary to set the threshold value Vth1 at a larger value than those of the TypeA standard and the FeliCa standard. Thus, the active load modulation is more likely to be selected in the TypeB standard, leading to the increase in the communication distance. As described above, in the communication system 1C, utilizing the threshold value Vth1 in accordance with the communication standard SP makes it possible to make a change-over between the passive load modulation and the active load modulation, in accordance with the communication performance in the relevant communication standard SP. As a result, in the communication system 1C, it is possible to enhance the communication quality.

2. Second Embodiment

Description is given next of a communication system 2 according to a second embodiment. This embodiment includes transmitting data by the active load modulation, without utilizing the passive load modulation. It is to be noted that substantially same constituent parts as those of the communication system 1 according to the forgoing first embodiment are denoted by the same reference characters, and description thereof is omitted as appropriate.

FIG. 9 illustrates one configuration example of the communication system 2 according to this embodiment. The communication system 2 includes a communication device 40. The communication device 40 includes the coil 21, the capacitor 22, the switches 23A and 23B, the amplifiers 24A and 24B, the demodulator unit 27, the phase synchronizer unit 28, the phase adjuster unit 29, the amplitude detector unit 30, the data generator unit 31, and a communication controller unit 42. In other words, the communication device 40 is an equivalent of the communication device 20 according to the first embodiment, except that the switch 25 and the resistor 26 are eliminated, and that the communication controller unit 32 is replaced with the communication controller unit 42. That is, the communication device 40 transmits the data D2 to the communication device 10, by the active load modulation, without utilizing the passive load modulation.

The communication controller unit 42 generates the switch control signal SW1 on the basis of the data D2, and supplies the switch control signal SW1 to the switches 23A and 23B. Moreover, the communication controller unit 42 also has the function of setting the amount of the phase shift in the phase adjuster unit 29, on the basis of the amplitude value $V_{SW}$. Hence, as described below, it is possible to increase the communication distance.

In other words, first, the phase synchronizer unit 28 disposed at a pre-stage of the phase adjuster unit 29 generates, on the basis of the voltage signal at the other end of the coil 21, the signal S22 that synchronizes with the voltage signal. At this occasion, in some cases, the phase of the output signal S22 of the phase synchronizer unit 28 changes in accordance with the amplitude value $V_{SW}$ of the voltage signal at the other end of the coil 21. In this case, as represented by the expression (1), the amplitude in the composite signal W3 changes, causing possibility of a change in an upper limit of a communication distance from the communication device 10 to the communication device 40 (a communication-enabling distance).

FIG. 10 illustrates the communication-enabling distance in the TypeB standard. In FIG. 10, a vertical axis denotes the communication-enabling distance, whereas a horizontal axis denotes a phase of the signal S23, with reference to the phase of the voltage signal at the other end of the coil 21.

As illustrated in FIG. 10, as the phase of the signal S23 changes, the communication-enabling distance changes. In other words, as represented by the expression (1), as the phase of the signal S23 changes, the amplitude in the composite signal W3 changes, causing the degree of the modulation to change. As a result, the communication-enabling distance changes. In this example, in a case where the amplitude value $V_{SW}$ is 0.54V, the communication-enabling distance becomes the smallest in a case where the phase of the signal S23 is at or around 30 degrees. Likewise, in a case where the amplitude value $V_{SW}$ is 1.32V, the communication-enabling distance becomes the smallest in a case where the phase of the signal S23 is at or around 60 degrees.

The communication controller unit 42 sets, on the basis of the amplitude value $V_{SW}$, the amount of the phase shift in the phase adjuster unit 29, to increase the communication-enabling distance. Specifically, the communication controller unit 42 sets the amount of the phase shift in the phase adjuster unit 29 at an amount of a phase shift P1, in a case where the amplitude value $V_{SW}$ is equal to or larger than a predetermined threshold Vth2. The amount of the phase shift P1 is so set as to increase the communication-enabling distance, in a case where the amplitude value $V_{SW}$ is large. Moreover, the communication controller unit 42 sets the amount of the phase shift in the phase adjuster unit 29 at an amount of a phase shift P2, in a case where the amplitude value $V_{SW}$ is smaller than the predetermined threshold Vth2. The amount of the phase shift P2 is so set as to increase the communication-enabling distance, in a case where the amplitude value $V_{SW}$ is small. Hence, in the communication system 2, it is possible to increase the communication distance.

Here, the communication device 40 corresponds to one specific example of the "communication device" in the disclosure. The phase adjuster unit 29, the amplitude detector unit 30, and the communication controller unit 42 correspond to one specific example of a "phase adjuster" in the disclosure.

FIG. 11 illustrates one operation example of the communication system 2.

First, as with the case of the communication system 1 according to the first embodiment (FIG. 4), the communication device 10 transmits, by the ASK modulation, the data D1 to the communication device 40 (step S1). The demodulator unit 27 of the communication device 40 makes the confirmation as to whether or not the demodulator unit 27 has received the data D1 (step S2).

Thereafter, the amplitude detector unit 30 of the communication device 40 detects the amplitude value $V_{SW}$ of the voltage signal at the other end of the coil 21 (step S3).

Thereafter, the communication controller unit 42 of the communication device 40 compares the amplitude value $V_{SW}$ detected in step S3 with the predetermine threshold value Vth2 (step S34). In a case where the amplitude value $V_{SW}$ is equal to or larger than the threshold value Vth2 ($V_{SW} \geq$ Vth2), the communication controller unit 42 sets the amount of the phase shift in the phase adjuster unit 29 at the amount of the phase shift P1 (step S35). Meanwhile, in a case where the amplitude value $V_{SW}$ is smaller than the threshold value Vth2 ($V_{SW}$<Vth2), the communication controller unit 42 sets the amount of the phase shift in the phase adjuster unit 29 at the amount of the phase shift P2 (step S36).

Thereafter, the communication device 40 transmits, by the active load modulation, the data D2 to the communication device 10 (step S37).

Thus, the flow ends.

As described, in the communication system 2, the amount of the phase shift in the phase adjuster unit 29 is adjusted. Hence, it is possible to increase the communication distance. In particular, in the communication system 2, the amount of the phase shift in the phase adjuster unit 29 is adjusted on the basis of the amplitude value $V_{SW}$. Accordingly, even in a case where the phase of the output signal S22 of the phase synchronizer unit 28 changes in accordance with the amplitude value $V_{SW}$, it is possible to restrain the communication distance from being affected by the change in the phase. As a result, in the communication system 2, it is possible to enhance the communication quality.

As described above, in this embodiment, a configuration is made to be able to adjust the amount of the phase shift in the phase adjuster unit. Hence, it is possible to enhance the communication quality.

Modification Example 2-1

In the forgoing embodiment, the amplitude value $V_{SW}$ is compared with the single threshold value Vth2, to set the amount of the phase shift in the phase adjuster unit 29. However, this is non-limiting. In one alternative, for example, a plurality of threshold values may be provided. The amplitude value $V_{SW}$ may be compared with the plurality of the threshold values, to set the amount of the phase shift in the phase adjuster unit 29 more finely. Moreover, for example, as illustrated in FIG. 12, a look-up table may be utilized that summarizes relation between the amplitude value $V_{SW}$ and the amount of the phase shift in the phase adjuster unit 29. A communication controller unit 42A according to this modification example sets, in step S44, the amount of the phase shift in the phase adjuster unit 29, on the basis of the amplitude value $V_{SW}$ detected in step S3, with the utilization of the look-up table. It is to be noted that the look-up table is utilized in this example, but this is non-limiting. A function may be utilized that represents the relation between the amplitude value $V_{SW}$ and the amount of the phase shift in the phase adjuster unit 29.

Modification Example 2-2

In the forgoing embodiment, the amount of the phase shift in the phase adjuster unit 29 is set on the basis of the amplitude value $V_{SW}$. However, this is non-limiting. In the following, this modification example is described in detail by giving some examples.

FIG. 13 illustrates one configuration example of a communication system 2B according to this modification example. The communication system 2B includes a communication device 40B. The communication device 40B includes the demodulator unit 27B and a communication controller unit 42B. The demodulator unit 27B performs the demodulating operation on the basis of the voltage signal at the other end of the coil 21, to receive the data D1 transmitted from the communication device 10, while distinguishing the standard with which the communication device 10 is in conformity (the communication standard SP). The communication controller unit 42B sets the amount of the phase shift in the phase adjuster unit 29 on the basis of the communication standard SP.

Here, the phase adjuster unit 29, the demodulator unit 27B, and the communication controller unit 42B correspond to one specific example of the "phase adjuster" in the disclosure.

FIG. 14 illustrates one operation example of the communication system 2B.

First, as with the case of the communication system 2 (FIG. 11), the communication device 10 transmits, by the ASK modulation, the data D1 to the communication device 40B (step S1). The demodulator unit 27B of the communication device 40B makes the confirmation as to whether or not the demodulator unit 27B has received the data D1 (step S2).

Thereafter, the demodulator unit 27B of the communication device 40B distinguishes the communication standard SP (step S13).

Thereafter, the communication controller unit 42B of the communication device B0B sets the amount of the phase shift in the phase adjuster unit 29 on the basis of the communication standard SP distinguished in step S13 (step S54).

Thereafter, the communication device 40B transmits, by the active load modulation, the data D2 to the communication device 10 (step S37).

Thus, the flow ends.

As described, in the communication system 2B, the amount of the phase shift in the phase adjuster unit 29 is set on the basis of the communication standard SP. Hence, it is possible to enhance a degree of freedom in setting the amount of the phase shift. Specifically, for example, in a case where the communication standard SP is a standard utilized in the applications with the long communication distances, it is possible to set the amount of the phase shift, so as to increase the communication-enabling distance even more. As a result, in the communication system 2B, it is possible to enhance the communication quality.

FIG. 15 illustrates one configuration example of another communication system 2C according to this modification example. The communication system 2C includes a communication device 40C. The communication device 40C includes the demodulator unit 27B and a communication controller unit 42C. The communication controller unit 42C sets the amount of the phase shift in the phase adjuster unit 29 on the basis of the communication standard SP and on the basis of the amplitude value $V_{SW}$. Specifically, the communication controller unit 42C makes a change-over of the predetermined threshold value Vth2 and a change-over of the amounts of the phase shift P1 and P2, on the basis of the communication standard SP.

Here, the phase adjuster unit 29, the amplitude detector unit 30, the demodulator unit 27B, and the communication controller unit 42C correspond to one specific example of the "phase adjuster" in the disclosure.

FIG. 16 illustrates one operation example of the communication system 2C.

First, as with the case of the communication system 2B (FIG. 14), the communication device 10 transmits, by the ASK modulation, the data D1 to the communication device 40C (step S1). The demodulator unit 27B of the communication device 40C makes the confirmation as to whether or not the demodulator unit 27B has received the data D1 (step S2).

Thereafter, the demodulator unit 27B of the communication device 40C distinguishes the communication standard SP (step S13).

Thereafter, the communication controller unit 42C of the communication device 40C sets the threshold value Vth2, and the amounts of the phase shift P1 and P2, on the basis of the communication standard SP distinguished in step S13 (step S64).

Thereafter, the amplitude detector unit 30 of the communication device 40C detects the amplitude value $V_{SW}$ of the voltage signal at the other end of the coil 21 (step S3).

Thereafter, the communication controller unit 42C of the communication device 40C compares the amplitude value $V_{SW}$ detected in step S3 with the predetermined threshold value Vth2 (step S34). In a case where the amplitude value $V_{SW}$ is equal to or larger than the threshold value Vth2 ($V_{SW} \geq$ Vth2), the communication controller unit 42C sets the amount of the phase shift in the phase adjuster unit 29 at the amount of the phase shift P1 (step S35). Meanwhile, in a case where the amplitude value $V_{SW}$ is smaller than the threshold value Vth2 ($V_{SW}<$Vth2), the communication controller unit 42C sets the amount of the phase shift in the phase adjuster unit 29 at the amount of the phase shift P2 (step S36).

Thereafter, the communication device 40C transmits, by the active load modulation, the data D2 to the communication device 10 (step S37).

Thus, the flow ends.

As described, in the communication system 2C, the change-over of the threshold value Vth2 and the change-over of the amounts of the phase shift P1 and P2 are made on the basis of the communication standard SP. Hence, it is possible to enhance the degree of the freedom in setting the amount of the phase shift. As a result, in the communication system 2C, it is possible to enhance the communication quality.

3. Third Embodiment

Description is given next of a communication system 3 according to a third embodiment. In this embodiment, a configuration is made to be able to select either the passive load modulation or the active load modulation. In addition, this embodiment includes setting the amount of the phase shift in the phase adjuster unit 29, in a case where the active load modulation has been selected. It is to be noted that substantially same constituent parts as those of the communication systems 1 and 2 according to the first and second embodiments are denoted by the same reference characters, and description thereof is omitted as appropriate.

FIG. 17 illustrates one configuration example of the communication system 3 according to this embodiment. The communication system 3 includes a communication device 50. The communication device 50 includes a communication controller unit 52. The communication controller unit 52 generates the switch control signals SW1 and SW2 on the basis of the communication standard SP and on the basis of the data D2. Specifically, as with the communication controller unit 32B according to the modification example of the first embodiment, the communication controller unit 52 turns on and off the switches 23A and 23B in accordance with the data D2, in the case where the communication standard SP is included in the one or more communication standards set in advance. In other words, in this case, the communication device 50 utilizes the active load modulation. Moreover, the communication controller unit 52 turns on and off the switch 25 in accordance with the data D2, in the case where the communication standard SP is not included in the one or more communication standards. In other words, in this case, the communication device 50 utilizes the passive load modulation. At this occasion, in utilizing the active load modulation, the communication controller unit 52 also has a function of controlling the amount of the phase shift in the phase adjuster unit 29, on the basis of the amplitude value $V_{SW}$, as with the communication controller unit 42 according to the second embodiment.

FIG. 18 illustrates one operation example of the communication system 3.

First, as with the case of the communication system 1B according to the modification example of the first embodiment (FIG. 6), the communication device 10 transmits, by the ASK modulation, the data D1 to the communication device 50 (step S1). The demodulator unit 27B of the communication device 50 makes the confirmation as to whether or not the demodulator unit 27B has received the data D1 (step S2).

Thereafter, the demodulator unit 27B of the communication device 50 distinguishes the communication standard SP (step S13).

Thereafter, the communication controller unit 32B of the communication device 50 makes the confirmation as to whether or not the communication standard SP distinguished in step S13 is included in the one or more predetermined communication standards set in advance (step S14). In the case where the communication standard SP is not included in the one or more predetermined communication standards, the communication device 50 transmits, by the passive load modulation, the data D2 to the communication device 10 (step S16).

In step S14, in the case where the communication standard SP is included in the one or more predetermined communication standards, the amplitude detector unit 30 of the communication device 50 detects the amplitude value $V_{SW}$ of the voltage signal at the other end of the coil 21 (step S3).

Thereafter, the communication controller unit 52 of the communication device 50 compares the amplitude value $V_{SW}$ detected in step S3 with the predetermined threshold value Vth2 (step S34). In the case where the amplitude value $V_{SW}$ is equal to or larger than the threshold value Vth2 ($V_{SW} \geq$ Vth2), the communication controller unit 52 sets the amount of the phase shift in the phase adjuster unit 29 at the amount of the phase shift P1 (step S35). Meanwhile, in the case where the amplitude value $V_{SW}$ is smaller than the threshold value Vth2 ($V_{SW}<$Vth2), the communication controller unit 52 sets the amount of the phase shift in the phase adjuster unit 29 at the amount of the phase shift P2 (step S36).

Thereafter, the communication device 50 transmits, by the active load modulation, the data D2 to the communication device 10 (step S37).

Thus, the flow ends.

As described, in this embodiment, the configuration is made to be able to select either the passive load modulation or the active load modulation. In addition, this embodiment includes adjusting the amount of the phase shift in the phase adjuster unit 29 in the case where the active load modulation has been selected. Hence, it is possible to enhance the communication quality.

Although description has been made by giving the embodiments and the modification examples, the contents of the technology are not limited to the above-mentioned example embodiments and may be modified in a variety of ways.

For example, the third embodiment provides a combination of the communication controller unit 32B according to the modification example of the first embodiment and the communication controller unit 42 according to the second embodiment. However, this is non-limiting. There may be provided any combinations of the communication controller units according to the embodiments and their modification examples.

It is to be noted that effects described herein are merely exemplified. Effects of the disclosure are not limited to the effects described herein. Effects of the disclosure may further include other effects than the effects described herein.

Moreover, for example, the technology may have the following configuration.

(1) A communication device, including:
a signal generator that generates, on the basis of a first signal received from a communication partner through a coil, a second signal that synchronizes with the first signal;
a first modulator configured to be able to modulate the first signal on the basis of the second signal;
a second modulator configured to be able to modulate the first signal; and
a communication controller that selects, on the basis of the first signal, whichever modulator is to be operated, from the first modulator and the second modulator.

(2) The communication device according to (1), in which the communication controller selects, on the basis of an amplitude value of the first signal, whichever modulator is to be operated, from the first modulator and the second modulator.

(3) The communication device according to (2), in which the communication controller selects the second modulator on the condition that the amplitude value is larger than a predetermined value, and selects the first modulator on the condition that the amplitude value is smaller than the predetermined value.

(4) The communication device according to (3), in which the communication controller sets the predetermined value on the basis of a communication method with the communication partner.

(5) The communication device according to (1), in which the communication controller selects, on the basis of a communication method with the communication partner, whichever modulator is to be operated, from the first modulator and the second modulator.

(6) The communication device according to (4) or (5), in which
the communication partner modulates the first signal, and
the communication controller distinguishes the communication method on the basis of a degree of modulation of the first signal modulated by the communication partner.

(7) The communication device according to any one of (1) to (6), further including a phase adjuster that adjusts a phase of the second signal on the basis of the first signal, in which
the first modulator is configured to be able to modulate the first signal on the basis of the second signal the phase of which has been adjusted by the phase adjuster.

(8) The communication device according to any one of (1) to (7), in which
the signal generator includes a phase synchronization circuit.

(9) The communication device according to any one of (1) to (8), in which the first modulator includes a first switch, and turning on of the first switch causes the second signal to be supplied to the coil.

(10) The communication device according to any one of (1) to (9), in which
the second modulator includes a second switch coupled to the coil.

(11) A communication device, including:
a signal generator that generates, on the basis of a first signal received from a communication partner through a coil, a second signal that synchronizes with the first signal;
a phase adjuster that adjusts a phase of the second signal on the basis of the first signal; and
a first modulator configured to be able to modulate the first signal on the basis of the second signal the phase of which has been adjusted by the phase adjuster.

(12) The communication device according to (11), in which
the phase adjuster adjusts the phase of the second signal on the basis of an amplitude value of the first signal.

(13) The communication device according to (12), in which
the phase adjuster sets the phase of the second signal at a first phase value on the condition that the amplitude value is larger than a predetermined value, and sets the phase of the second signal at a second phase value on the condition that the amplitude value is smaller than the predetermined value.

(14) The communication device according to (13), in which
the phase adjuster sets the predetermined value on the basis of a communication method with the communication partner.

(15) The communication device according to (14), in which
the phase adjuster sets the first phase value and the second phase value on the basis of the communication method with the communication partner.

(16) The communication device according to (11), in which
the phase adjuster adjusts the phase of the second signal on the basis of a communication method with the communication partner.

(17) The communication device according to any one of (14) to (16), in which
the communication partner modulates the first signal, and
the phase adjuster distinguishes the communication method on the basis of a degree of modulation of the first signal modulated by the communication partner.

(18) The communication device according to any one of (11) to (17), further including:
a second modulator configured to be able to modulate the first signal; and
a communication controller that selects, on the basis of the first signal, whichever modulator is to be operated, from the first modulator and the second modulator, in which
the phase adjuster adjusts the phase of the second signal on the basis of the first signal, on the condition that the communication controller has selected the first modulator.

(19) A communication method, including:
allowing a coil to receive a first signal from a communication partner;
generating, on the basis of the first signal, a second signal that synchronizes with the first signal; and
selecting, on the basis of the first signal, whichever modulator is to be operated, from a first modulator and a second modulator, the first modulator being configured to be able to modulate the first signal on the basis of the second signal, and the second modulator being configured to be able to modulate the first signal.

(20) A communication method, including:

allowing a coil to receive a first signal from a communication partner;

generating, on the basis of the first signal, a second signal that synchronizes with the first signal;

adjusting a phase of the second signal on the basis of the first signal; and allowing a first modulator to operate, the first modulator being configured to be able to modulate the first signal on the basis of the second signal the phase of which has been adjusted.

It should be understood by those skilled in the art that various modifications, combinations, sub-combinations and alterations may occur depending on design requirements and other factors insofar as they are within the scope of the appended claims or the equivalents thereof.

The invention claimed is:

1. A communication device comprising:
   a signal generator configured to
      receive a reception signal from a communication partner via a coil, and
      generate a transmission signal based on the reception signal, the transmission signal being synchronized with the reception signal;
   a first modulator configured to modulate the transmission signal;
   a second modulator configured to modulate the reception signal;
   a communication controller configured to select one of the first modulator or the second modulator based on a communication distance from the communication partner to the communication device.

2. The communication device according to claim 1, wherein the second modulator is further configured to modulate the reception signal based on the transmission signal.

3. The communication device according to claim 2, further comprising:
   a demodulator unit configured to
      distinguish a communication standard type of the reception signal from the communication partner, and
      supply a distinction result indicative of the communication standard type to the communication controller.

4. The communication device according to claim 3, wherein the communication standard type is one communication standard type selected from a group consisting of:
   a Type A standard,
   a Type B standard,
   a FeliCa standard, and
   an ISO15693 standard.

5. The communication device according to claim 1, wherein, to select the one of the first modulator or the second modulator based on the communication distance from the communication partner to the communication device, the communication controller is further configured to
   detect an amplitude value of the reception signal, and
   determine the communication distance based on the amplitude value.

6. The communication device according to claim 5, wherein the first modulator is configured to perform an active load modulation, and wherein the second modulator is configured to perform a passive load modulation.

7. The communication device according to claim 6, wherein, to determine the communication distance based on the amplitude value, the communication controller is further configured to
   determine whether the amplitude value is equal to or larger than a predetermined threshold value,
   select the second modulator in response to determining that the amplitude value is equal to or larger than the predetermined threshold value, and
   select the first modulator in response to determining that the amplitude value is not equal to or larger than the predetermined threshold value.

8. The communication device according to claim 6, wherein, to determine the communication distance based on the amplitude value, the communication controller is further configured to
   detect a change in the amplitude value from being equal to or larger than a predetermined threshold value to being lower than the predetermined threshold value, and
   select the first modulator in response to detecting the change in the amplitude value from being equal to or larger than the predetermined threshold value to being lower than the predetermined threshold value.

9. The communication device according to claim 6, wherein, to determine the communication distance based on the amplitude value, the communication controller is further configured to
   detect a change in the amplitude value from being lower than a predetermined threshold value to being equal to or larger than the predetermined threshold value, and
   select the second modulator in response to detecting the change in the amplitude value from being lower than the predetermined threshold value to being equal to or larger than the predetermined threshold value.

10. The communication device according to claim 1, wherein the first modulator is configured to modulate the transmission signal with an amplitude shift keying (ASK) modulation.

11. The communication device according to claim 1, further comprising:
    a phase adjuster circuitry configured to adjust a phase of the transmission signal based on the reception signal.

12. A communication system comprising:
    a first communication device; and
    a second communication device including
       a signal generator configured to
          receive a reception signal from the first communication device via a coil, and
          generate a transmission signal based on the reception signal, the transmission signal being synchronized with the reception signal,
       a first modulator configured to modulate the transmission signal,
       a second modulator configured to modulate the reception signal,
       a communication controller configured to select one of the first modulator or the second modulator based on a communication distance from the first communication device to the second communication device.

13. The communication system according to claim 12, wherein the second modulator is further configured to modulate the reception signal based on the transmission signal.

14. The communication system according to claim 13, wherein the second communication device further includes
    a demodulator unit configured to distinguish a communication standard type of the reception signal from the first communication device, and
supply a distinction result indicative of the communication standard type to the communication controller.

15. The communication system according to claim 14, wherein the communication standard type is one communication standard type selected from a group consisting of:
a Type A standard,
a Type B standard,
a FeliCa standard, and
an ISO15693 standard.

16. The communication system according to claim 12, wherein, to select the one of the first modulator or the second modulator based on the communication distance from the first communication device to the second communication device, the communication controller is further configured to
detect an amplitude value of the reception signal, and
determine the communication distance based on the amplitude value.

17. The communication system according to claim 16, wherein the first modulator is further configured to perform an active load modulation, and wherein the second modulator is configured to perform a passive load modulation.

18. The communication system according to claim 17, wherein, to determine the communication distance based on the amplitude value, the communication controller is further configured to
determine whether the amplitude value is equal to or larger than a predetermined threshold value,
select the second modulator in response to determining that the amplitude value is equal to or larger than the predetermined threshold value, and
select the first modulator in response to determining that the amplitude value is not equal to or larger than the predetermined threshold value.

19. The communication system according to claim 17, wherein, to determine the communication distance based on the amplitude value, the communication controller is further configured to
detect a change in the amplitude value from being equal to or larger than a predetermined threshold value to being lower than the predetermined threshold value, and
select the first modulator in response to detecting the change in the amplitude value from being equal to or larger than the predetermined threshold value to being lower than the predetermined threshold value.

20. The communication system according to claim 17, wherein, to determine the communication distance based on the amplitude value, the communication controller is further configured to
detect a change in the amplitude value from being lower than a predetermined threshold value to being equal to or larger than the predetermined threshold value, and
select the second modulator in response to detecting the change in the amplitude value from being lower than the predetermined threshold value to being equal to or larger than the predetermined threshold value.

21. The communication system according to claim 12, wherein the first communication device includes a coil and a demodulator unit configured to receive data from the second communication device by detecting an amplitude or a phase of a voltage signal at one end of the coil of the first communication device.

22. The communication system according to claim 12, wherein the second communication device further includes a phase adjuster circuitry configured to adjust a phase of the transmission signal based on the reception signal.

23. A communication device comprising:
a signal generator configured to
receive a reception signal from a communication partner via a coil, and
generate a first signal based on the reception signal, the first signal being synchronized with the reception signal;
a first modulator configured to modulate the reception signal based on the first signal;
a second modulator configured to modulate the reception signal; and
a communication controller configured to select one of the first modulator or the second modulator based on a communication distance from the communication partner to the communication device.

24. The communication device according to claim 23, wherein the communication controller is further configured to distinguish a communication standard type of the reception signal from the communication partner.

25. The communication device according to claim 24, wherein the communication standard type is one communication standard type selected from a group including:
a Type A standard,
a Type B standard, and
a FeliCa standard.

26. The communication device according to claim 24, wherein the communication controller is configured to control the first modulator and the second modulator based on the communication standard type.

27. The communication device according to claim 24, wherein the communication controller is further configured to select from the first modulator and the second modulator based on the communication standard type.

28. The communication device according to claim 23, wherein, to select one of the first modulator or the second modulator based on the communication distance from the communication partner to the communication device, the communication controller is further configured to
detect an amplitude value of the reception signal, and
determine the communication distance based on the amplitude value.

29. The communication device according to claim 28, wherein the communication controller is further configured to control the first modulator and the second modulator based on the amplitude value.

30. The communication device according to claim 28, wherein the communication controller is further configured to select from the first modulator and the second modulator based on the amplitude value.

31. The communication device according to claim 28, wherein, to determine the communication distance based on the amplitude value, the communication controller is further configured to
determine whether the amplitude value is equal to or larger than a predetermined threshold value,
select the second modulator in response to determining that the amplitude value is equal to or larger than the predetermined threshold value, and
select the first modulator in response to determining that the amplitude value is not equal to or larger than the predetermined threshold value.

32. The communication device according to claim 23, wherein the second modulator is configured to modulate the reception signal without using the first signal.

33. The communication device according to claim 23, wherein the first modulator is further configured to perform an active load modulation, and wherein the second modulator is configured to perform a passive load modulation.

* * * * *